United States Patent
Sakano et al.

(10) Patent No.: US 9,989,678 B2
(45) Date of Patent: Jun. 5, 2018

(54) ANISOTROPIC OPTICAL FILM

(71) Applicant: Tomoegawa Co., Ltd., Tokyo (JP)

(72) Inventors: Tsubasa Sakano, Shizuoka (JP);
Masahide Sugiyama, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 73 days.

(21) Appl. No.: 15/129,219

(22) PCT Filed: Mar. 17, 2015

(86) PCT No.: PCT/JP2015/057865
§ 371 (c)(1),
(2) Date: Mar. 8, 2017

(87) PCT Pub. No.: WO2015/146708
PCT Pub. Date: Oct. 1, 2015

(65) Prior Publication Data
US 2017/0192137 A1    Jul. 6, 2017

(30) Foreign Application Priority Data
Mar. 28, 2014 (JP) ................................ 2014-069771

(51) Int. Cl.
*G02B 5/02* (2006.01)
*G02F 1/1335* (2006.01)
(Continued)

(52) U.S. Cl.
CPC ............ *G02B 5/0257* (2013.01); *B05D 3/06* (2013.01); *B05D 5/06* (2013.01); *B05D 7/04* (2013.01);
(Continued)

(58) Field of Classification Search
CPC .. G02B 5/0257; G02B 5/0268; G02B 5/0278; B05D 3/06; B05D 5/06; B05D 7/04;
(Continued)

(56) References Cited

U.S. PATENT DOCUMENTS

2005/0101698 A1    5/2005  Harada et al.
2006/0261318 A1    11/2006 Morimoto et al.
(Continued)

FOREIGN PATENT DOCUMENTS

TW          201437692    * 10/2014  .......... C08F 299/065
WO      WO2014084361    *  6/2014  .......... G02B 5/0236

*Primary Examiner* — Zachary Wilkes
*Assistant Examiner* — George G King
(74) *Attorney, Agent, or Firm* — Norris McLaughlin & Marcus, P.A.

(57) ABSTRACT

In an anisotropic optical film including two or more anisotropic light diffusion layers where a linear transmittance varies depending on an incident light angle, each of the anisotropic light diffusion layers has a matrix region and a plurality of pillar regions that differ in refractive index from the matrix region, at least two types of anisotropic light diffusion layers (a) and (b) that differ in aspect ratio between a short diameter and a long diameter at a cross section perpendicular to an orientation direction of the pillar regions are used as the anisotropic light diffusion layers, the aspect ratio between the short diameter and the long diameter in the pillar regions is made less than 2 in the anisotropic light diffusion layer (a), and the aspect ratio between the short diameter and the long diameter in the pillar regions is made 2 or more and 20 or less in the anisotropic light diffusion layer (b).

20 Claims, 13 Drawing Sheets

(51) Int. Cl.

| | |
|---|---|
| *B05D 7/04* | (2006.01) |
| *B29D 11/00* | (2006.01) |
| *B05D 5/06* | (2006.01) |
| *B05D 3/06* | (2006.01) |
| *B29K 667/00* | (2006.01) |
| *B29K 33/00* | (2006.01) |

(52) U.S. Cl.
CPC ...... *B29D 11/00798* (2013.01); *G02B 5/0268* (2013.01); *G02B 5/0278* (2013.01); *G02F 1/133504* (2013.01); *B29K 2033/08* (2013.01); *B29K 2667/003* (2013.01)

(58) Field of Classification Search
CPC ........ B29D 11/00798; G02F 1/133504; B29K 2033/08; B29K 2667/003
USPC .................................. 359/599; 349/112, 193
See application file for complete search history.

(56) References Cited

U.S. PATENT DOCUMENTS

| | | | |
|---|---|---|---|
| 2007/0110957 A1 | 5/2007 | Higashi et al. | |
| 2015/0286101 A1* | 10/2015 | Katsuta ............ | G02F 1/133504 349/33 |
| 2015/0346396 A1* | 12/2015 | Sugiyama ............ | G02B 5/0257 359/599 |
| 2016/0025907 A1* | 1/2016 | Kusama ............ | C08F 299/065 359/599 |

\* cited by examiner

ANISOTROPIC OPTICAL FILM

BACKGROUND OF THE INVENTION

The present invention relates to an anisotropic optical film which changes the diffusibility of transmitted light depending on the incident light angle.

Members that have light diffusibility (light diffusion members) are used for lighting fixtures and building materials, as well as in display devices. The display devices include, for example, liquid crystal display devices (LCD) and organic electroluminescence elements (organic EL). The light diffusion mechanisms of the light diffusion members include scattering by asperity formed at the surfaces (surface scattering), scattering due to a refractive index difference between a matrix resin and microparticles dispersed therein (internal scattering), and both surface scattering and internal scattering. However, these light diffusion members generally have isotropic diffusion performance, and even when the incident light angles are somewhat changed, the diffusion characteristics of transmitted light do not vary significantly.

On the other hand, anisotropic optical films are known which are able to intensively diffuse incident light in a certain angle region and transmit incident light in the other angle region, that is, vary the linear transmitted light quantity depending on the incident light angles. As such an anisotropic optical film, an anisotropic diffusion medium is disclosed where an assembly of pillar-like cured regions all extending parallel to a predetermined direction P is formed within a resin layer composed of a cured product of a composition including a photopolymerizable compound (for example, see JP 2005-265915 A). It is to be noted that the structure of an anisotropic optical film where an aggregate of multiple pillar-like cured regions extending parallel to a predetermined direction P is formed as described in JP 2005-265915 A will be hereinafter referred to as a "columnar structure" in this specification.

In the anisotropic optical film which has the columnar structure, when there is light incident onto the film from top toward bottom, there is identical diffusion in a flow direction in the film manufacturing process (hereinafter, referred to as an "MD direction") and in a film width direction perpendicular to the MD direction (hereinafter, referred to as a "TD direction"). More specifically, diffusion is isotropic in the anisotropic optical film which has the columnar structure. Therefore, the anisotropic optical film which has the columnar structure is unlikely to produce a rapid change in brightness or produce glare.

However, the anisotropic optical film of columnar structure has the problem of being low in linear transmittance in a non-diffusion region as an angular range of incident light for high linear transmittance, and small in the width (diffusion width) of a diffusion region as an angular range of incident light for low linear transmittance (that is, high diffusion intensity).

On the other hand, rather than the columnar structure mentioned above, the use of an anisotropic optical film where an aggregate of one or more plate-like cured regions is formed within a resin layer composed of a cured product of a composition including a photopolymerizable compound (see, for example, JP4802707 B2) as an anisotropic optical film can improve the linear transmittance in a non-diffusion region to increase the diffusion width. It is to be noted that the structure of an anisotropic optical film where an aggregate of one or more plate-like cured regions is formed as described in JP4802707 B2 will be hereinafter referred to as a "tabular structure" in this specification.

In the anisotropic optical film which has the tabular structure, when there is light incident onto the film from top toward bottom, there is a difference in diffusion between in the MD direction and in the TD direction. More specifically, diffusion is anisotropic in the anisotropic optical film which has the tabular structure. Specifically, for example, the width (diffusion width) of a diffusion region is made larger than that of the columnar structure in the MD direction, the diffusion width is made smaller than that of the columnar structure in the TD direction. Therefore, the anisotropic optical film which has the tabular structure has the problem of being likely to cause light interference and thus generate glare, for example, when the diffusion width is decreased in the TD direction, as a result of causing a rapid change in brightness in the TD direction.

In contrast, in order to solve the problems with the anisotropic optical film of columnar structure and the anisotropic optical film of tabular structure, provide favorable dependency on incident light angles for light transmission and diffusion, and expand the widths of the diffusion regions, for example, JP2012-141593 A discloses an anisotropic optical film obtained by stacking an anisotropic light diffusion layer of columnar structure (corresponding to the "column structure" in JP2012-141593 A) and an anisotropic light diffusion layer of tabular structure. Other background prior art is JP 2005-265915 A and JP 4802707 B2.

SUMMARY OF INVENTION

However, the anisotropic optical film described in JP2012-141593 A has, because of the use of the anisotropic light diffusion layer of tabular structure, a diffusion width expanded in the MD direction, but still fails to have a diffusion width extended insufficiently in the TD direction, and has the problem of being likely to produce a rapid change in brightness in the TD direction and produce glare.

Therefore, the present invention has been made in order to solve the problem mentioned above, and an object of the invention is to provide an anisotropic optical film which has a high linear transmittance in a non-diffusion region, and has a large diffusion region in the MD direction and the TD direction, thereby making it possible to solve problems such as a rapid change in brightness and generation of glare.

The inventors have found, as a result of earnestly carrying out studies in order to solve the problem mentioned above, that found that an anisotropic light diffusion layer that has a columnar structure and an anisotropic light diffusion layer including a pillar region where a cross-sectional shape has a lower aspect ratio than a tabular structure, and a higher aspect ratio than the columnar structure are stacked, thereby making it possible to achieve a balance between a high linear transmittance in the non-diffusion region and a large diffusion region in the MD direction and the TD direction, and achieved the present invention on the basis of the finding.

More specifically, the present invention provides an anisotropic optical film including two or more anisotropic light diffusion layers where a linear transmittance varies depending on an incident light angle, each of the anisotropic light diffusion layers has a matrix region and a plurality of pillar regions that differ in refractive index from the matrix region, the film includes, as the anisotropic light diffusion layers, at least two types of anisotropic light diffusion layers (a) and (b) that differ in aspect ratio (long diameter/short diameter) between a short diameter and a long diameter at a cross section perpendicular to an orientation direction of the pillar regions, the aspect ratio between the short diameter and the long diameter in the pillar regions is less than 2 in the anisotropic light diffusion layer (a), and the aspect ratio between the short diameter and the long diameter in the pillar regions is 2 or more and 20 or less in the anisotropic light diffusion layer (b).

In this regard, preferably, in the anisotropic light diffusion layer (a), the short diameter at a cross section of the pillar region has a maximum diameter adjusted to a value in the range of 0.5 to 5 µm, whereas the long diameter at the section has a maximum diameter adjusted to a value in the range of 0.5 to 8 µm, and in the anisotropic light diffusion layer (b), the short diameter at a cross section of the pillar region has a maximum value adjusted to a value in the range of 0.5 to 5 µm, whereas the long diameter at the section has a maximum diameter adjusted to a value in the range of 1 to 40 µm.

In the anisotropic optical film, each of the anisotropic light diffusion layer preferably has a maximum linear transmittance of 20% or more and less than 95% as a linear transmittance of incident light at an incident light angle that maximizes the linear transmittance, and a minimum linear transmittance of 25% or less as a linear transmittance of incident light at an incident light angle that minimizes the linear transmittance.

In addition, in the anisotropic optical film, preferably, the anisotropic light diffusion layer (a) has the maximum linear transmittance of 20% or more and less than 60%, and the minimum linear transmittance of 20% or less, and the anisotropic light diffusion layer (b) has the maximum linear transmittance of 30% or more and less than 95%, and the minimum linear transmittance of 25% or less.

In addition, in the anisotropic optical film, preferably, the anisotropic light diffusion layers each have at least one axis of scattering center, and when the polar angle θ (−90°<θ<90°) between the normal line of the anisotropic light diffusion layer and the axis of scattering center is regarded as an angle of the axis of scattering center, the absolute value of a difference is 0° or more and 30° or less between the angle of the axis of scattering center for the anisotropic light diffusion layer (a) and the angle of the axis of scattering center for the anisotropic light diffusion layer (b).

In addition, in the anisotropic optical film, the anisotropic light diffusion layers are preferably each 15 µm or more and 100 µm or less in thickness.

In addition, in the anisotropic optical film, the anisotropic optical film may further include a transparent pressure-sensitive adhesive layer between the multiple anisotropic light diffusion layers.

Furthermore, the present invention provides a method for manufacturing the anisotropic optical film described above, which includes an anisotropic light diffusion layer (a) formation step of forming the anisotropic light diffusion layer (a); and an anisotropic light diffusion layer (b) formation step of forming the anisotropic light diffusion layer (b), where the anisotropic light diffusion layer (a) formation step includes the steps of: obtaining a parallel ray from a light source; and making the light incident onto a photo-curable composition layer, thereby curing the photo-curable composition layer, and the anisotropic light diffusion layer (b) formation step includes the steps of: obtaining a parallel ray from a light source; making the parallel ray incident onto a directional diffusion element, thereby providing directional light; and making the directional light incident onto a photo-curable composition layer, thereby curing the photo-curable composition layer.

In the method for manufacturing the anisotropic optical film, the directional light preferably has an aspect ratio in the range of 2 or more and 20 or less.

In this regard, the definitions of major terms in the claims and specification will be described.

The terms of "low refractive index region" and "high refractive index region" refer to regions formed from a difference between higher and lower local refractive indexes of the material constituting the anisotropic optical film according to the present invention, and indicate that the refractive index is relatively lower or higher as compared with the other. These regions are formed in curing the material that forms the anisotropic optical film.

The term of "axis of scattering center" means a direction that is coincident with an incident light angle of light, where a light diffusibility of the light is substantially symmetric with respect to the incident light angle when the incident light angle is varied onto the anisotropic optical film. The term of "being substantially symmetric" is used because optical characteristics ("optical profile" described later) are not strictly symmetric when the axis of scattering center is tilted with respect to the normal direction of the film. The axis of scattering center can be confirmed by observing, with an optical microscope, the tilt of a cross section in the anisotropic optical film, or observing the shape of light projection through the anisotropic optical film while varying the incident light angle.

In addition, the linear transmittance generally refers to, in regard to the linear permeability of light incident onto the anisotropic optical film, the ratio between the quantity of light transmitted in a linear direction and the quantity of incident light in the case of incidence from a certain incident light angle, which is represented by the following formula:

Linear Transmittance (%)=(Linear Transmitted Light Quantity/Incident Light Quantity)×100

In addition, in the present invention, the both terms of "scattering" and "diffusion" are used without any distinction, and the both represent the same meaning. Furthermore, the terms of "photopolymerization" and "light curing" are considered to mean a polymerization reaction of a photopolymerizable compound with light, and both used as synonyms.

According to the present invention, the anisotropic light diffusion layer including pillar regions with an aspect ratio of less than 2 and the anisotropic light diffusion layer including pillar regions with an aspect ratio of 2 or more and 20 or less can be stacked to provide an anisotropic optical film which achieves a balance between a high linear transmittance in a non-diffusion region and large diffusion regions in the MD direction and the TD direction. Accordingly, when the anisotropic optical film is used as a diffusion film of a display panel, it becomes possible to provide an anisotropic optical film which can, while keeping excellent display characteristics (e.g., brightness and contrast), suppress the rapid change in brightness and the generation of glare.

BRIEF DESCRIPTION OF THE DRAWINGS

FIG. 6(a) is a perspective view, FIG. 6(b) is a plan view, and FIG. 6(c) is a sectional view of FIG. 6(b) cut along the line C-C.

FIG. 7(a) is a perspective view, FIG. 7(b) is a plan view, and FIG. 7(c) is a sectional view of FIG. 7(b) cut along the line C-C.

DETAILED DESCRIPTION OF THE INVENTION

A preferred embodiment of the present invention will be described in detail below with reference to the drawings. It is to be noted that the constituent elements denoted by the same reference signs shall have substantially the same structure or function in the specification and drawings herein.

Further, an anisotropic optical film according to the present embodiment will be described in the following order.
1. Structure and Property of Anisotropic Optical Film
2. Problem of Related Art and Summary of Means for Solving the Problem
3. Configuration of Anisotropic Optical Film according to Present Embodiment
4. Production Method for Anisotropic Optical Film according to Present Embodiment
5. Intended Use of Anisotropic Optical Film according to Present Embodiment <<Structure and Property of Anisotropic Optical Film>>

Figure 1:
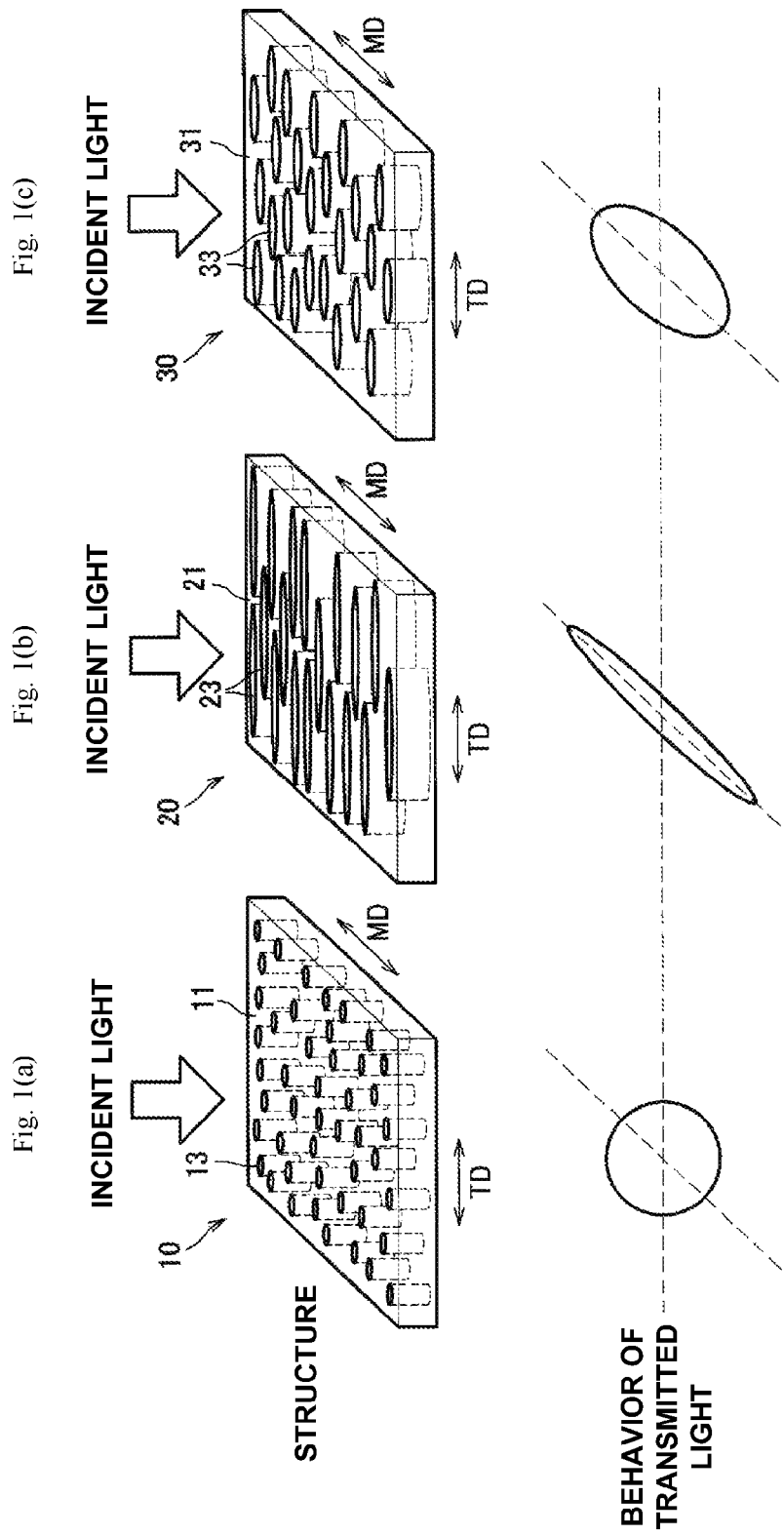
FIGS. 1(a) to 1(c) are pattern diagrams respectively illustrating structure examples of anisotropic optical films including pillar regions of columnar structure, tabular structure, and intermediate structure; and behavior examples of transmitted light incident onto the anisotropic optical films.
Figure 2:
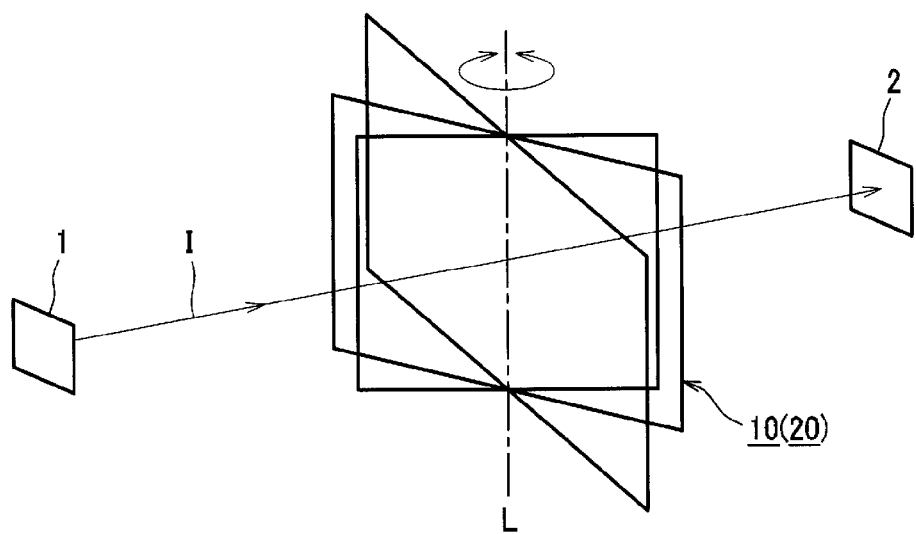
FIG. 2 is an explanatory diagram illustrating a method for evaluating light diffusibility of an anisotropic optical film.
Figure 3:
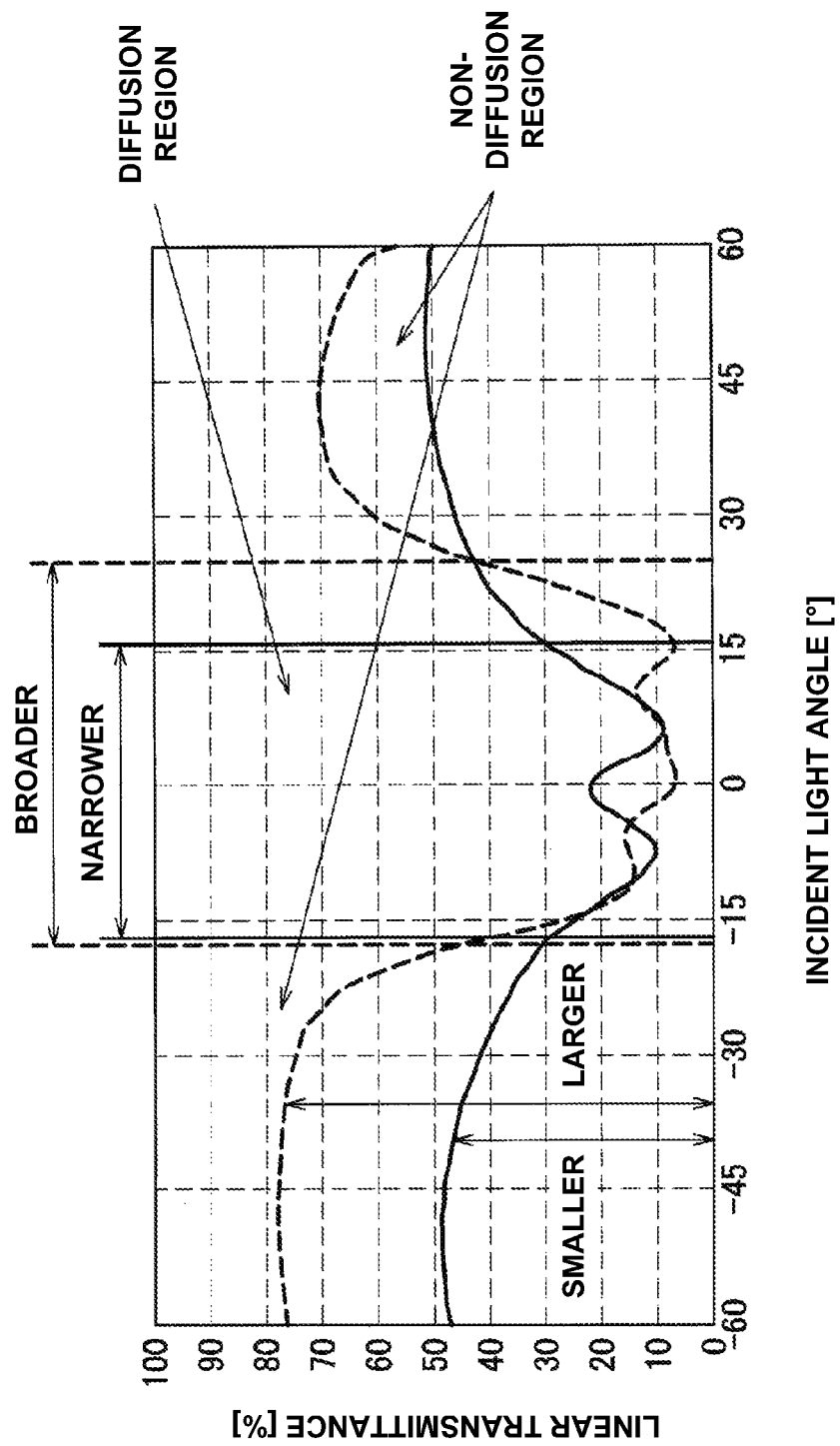
FIG. 3 is a graph showing the relationships between incident light angle onto the anisotropic optical films of columnar structure and tabular structure in FIG. 1 and linear transmittances.
Figure 4:
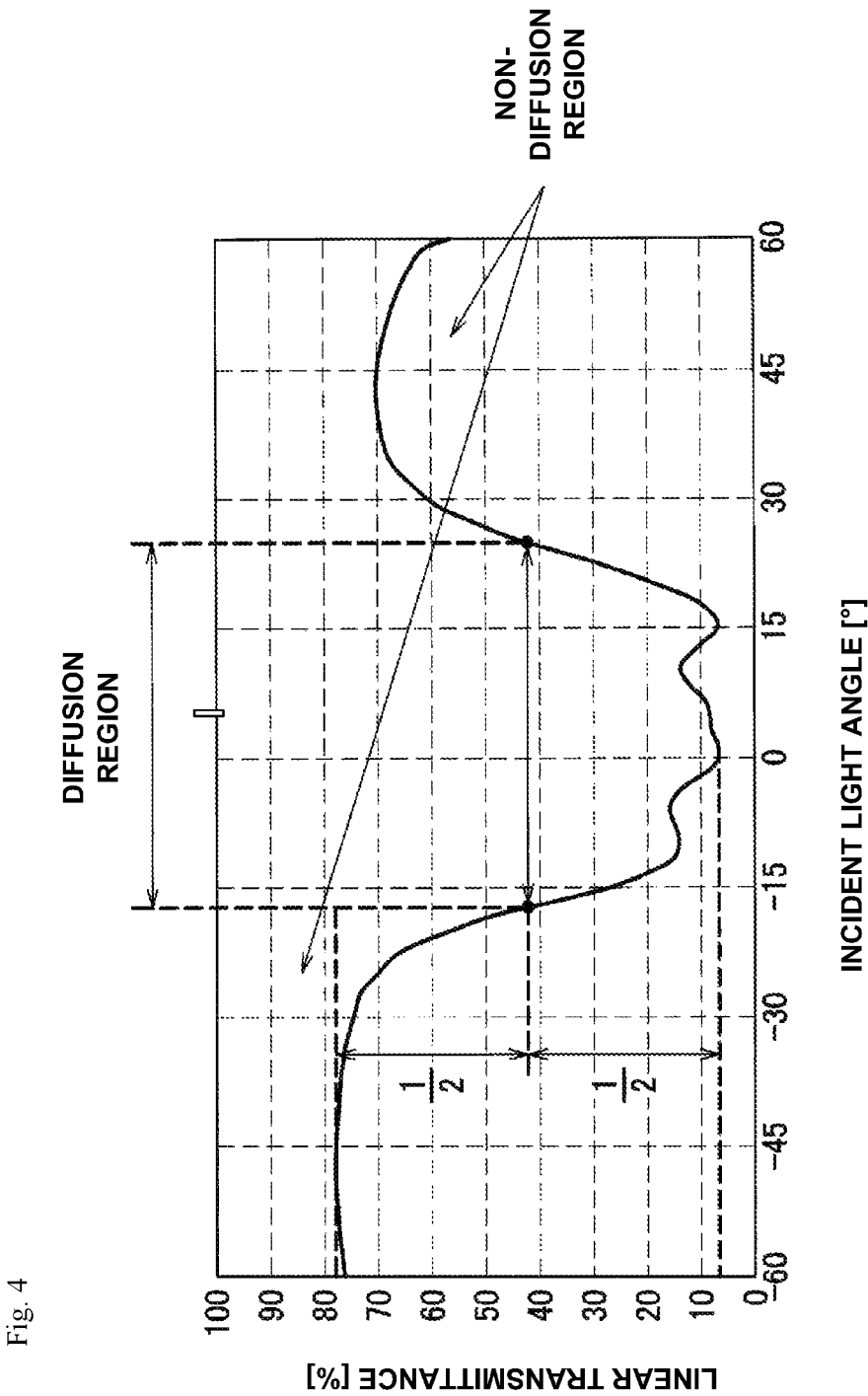
FIG. 4 is a graph for explaining a diffusion region and a non-diffusion region.

First, the structure and properties of single-layer anisotropic optical film (anisotropic optical film where the "anisotropic light diffusion layer" specified in the present embodiment has only a single layer) will be described with reference to FIGS. 1(a) to 4, as preparation for describing the anisotropic optical film according to the present embodiment. FIGS. 1(a) to 1(c) are pattern diagrams respectively illustrating structure examples of single layers of anisotropic optical films including pillar regions of columnar structure, tabular structure, and intermediate structure; and behavior examples of transmitted light incident onto the anisotropic optical films. FIG. 2 is an explanatory diagram illustrating a method for evaluating light diffusibility of an anisotropic optical film. FIG. 3 is a graph showing the relationships between incident light angle onto the anisotropic optical films of columnar structure and tabular structure in FIG. 1 and linear transmittances. FIG. 4 is a graph for explaining a diffusion region and a non-diffusion region.

(Structure of Anisotropic Optical Film)

The anisotropic optical film is a film where a region that differs in refractive index from a matrix region of the film is formed in the film thickness direction of the film. The shape of the region that differs in refractive index is not particularly limited, but there are, for example, as shown in FIG. 1(a), an anisotropic optical film 10 of a matrix region 11 with pillar regions 13 formed therein in the shape of a pillar with a low aspect ratio between a short diameter and a long diameter (for example, in the shape of a rod) to differ in refractive index (anisotropic optical film that has a columnar structure), as shown in FIG. 1(b), an anisotropic optical film 20 of a matrix region 21 with pillar regions 23 formed therein in the shape of a pillar with a high aspect ratio (for example, substantially in the shape of a plate) to differ in refractive index (anisotropic optical film that has a tabular structure), and as shown in FIG. 1(c), an anisotropic optical film of a matrix region 31 with pillar regions 33 formed therein with an intermediate aspect ratio between the columnar structure and the tabular structure (hereinafter, referred to as "an anisotropic optical film that has an intermediate structure").

(Property of Anisotropic Optical Film)

The anisotropic optical film that has the structure described above is a light diffusion film that varies a light diffusibility (linear transmittance) depending on the angle of incident light onto the film, that is, has a dependency on the incident light angle. Light incident at a predetermined incident light angle onto the anisotropic optical film is preferentially diffused when the light is substantially parallel to the orientation direction of the region that differs in refractive index (for example, the extending direction (orientation direction) of the pillar region 13 in the case of the columnar structure or the pillar region 33 in the case of the intermediate structure, or the height direction of the pillar regions 23 in the case of the tabular structure), or preferentially transmitted when the light is not parallel to the direction.

In this regard, light diffusibility of the anisotropic optical film will be described more specifically with reference to FIGS. 2 and 3. Explanations will be given herein with reference to light diffusibility of the above-mentioned anisotropic optical film 10 of columnar structure and anisotropic optical film 20 of tabular structure.

A method for evaluating the light diffusibility is implemented in the following way. First, as shown in FIG. 2, the anisotropic optical films 10, 20 are disposed between a light source 1 and a detector 2. In the present embodiment, the incident light angle was regarded as 0°, when irradiation light I from the light source 1 is incident from the normal direction of the anisotropic optical films 10, 20. In addition, the anisotropic optical films 10, 20 are disposed to be optionally rotatable around a line L, and the light source 1 and the detector 2 are fixed. More specifically, according to this method, with the sample (anisotropic optical film 10, 20) disposed between the light source 1 and the detector 2, the linear transmittance of travelling straight and passing through the sample onto the detector 2 can be measured while varying the angle with a line L at the sample surface as a central axis.

FIG. 3 shows the evaluation results of light diffusibility obtained by evaluating each of the anisotropic optical films 10, 20 for light diffusibility in the case of selecting a TD direction in FIG. 1 (an axis in the width direction of the anisotropic optical film) for the center line L of rotation shown in FIG. 2. FIG. 3 shows the dependency on incident light angles, of the light diffusibility (light scattering properties) of the anisotropic optical films 10, 20 shown in FIGS. 1(a) and 1(b), measured with the use of the method shown in FIG. 2. The vertical axis in FIG. 3 indicates a linear transmittance (in the present embodiment, in the case of a predetermined light quantity of incident parallel rays, the proportion of the light quantity of parallel rays emitted in the same direction as the incident direction, and more specifically, linear transmittance=the quantity of light detected by the detector 2 in the presence of the anisotropic optical film 10, 20/the quantity of light detected by the detector 2 in the absence of the anisotropic optical film 10, 20) as an indicator for the degree of scattering, whereas the horizontal axis therein indicates an incident light angle onto the anisotropic optical film 10, 20. The solid line in FIG. 3 shows the light diffusibility of the anisotropic optical film 10 of columnar structure, whereas the broken line therein shows the light diffusibility of the anisotropic optical film 20 of tabular structure. It is to be noted that the positive and negative of the incident light angle indicate opposite directions of rotating the anisotropic optical film 10, 20.

As shown in FIG. 3, the anisotropic optical films 10, 20 have a dependency of light diffusibility on the incident light angle, which means that the linear transmittance varies depending on the incident light angle. In this regard, the curve which shows a dependency of light diffusibility on the incident light angle as in FIG. 3 will be hereinafter referred to as an "optical profile". The optical profile is not intended to directly represent the light diffusiblity, but can be considered to generally represent the light diffusibility as long as a decrease in linear transmittance is conversely taken as an increase in diffuse transmittance. While a normal isotropic light diffusion film exhibits a mountain-like optical profile with a peak around 0°, the anisotropic optical film 10, 20 exhibits a valley-like optical profile where the linear transmittance reaches a minimum value once at an incident light angle of ±5 to 10°, increases as (the absolute value of) the incident light angle increases, and reaches a maximum value at an incident light angle of ±45 to 60°, as compared with the linear transmittance in the case of incidence in the central axis (thickness) direction of the pillar region 13, 23, that is, in the direction of the axis of scattering center (the incident light angle in this direction is referred to as 0°). As just described, the anisotropic optical film 10, 20 has the property that incident light is intensively diffused in the incident light angle range of ±5 to 10° close to the direction of the axis of scattering center, while the diffusion is attenuated to increase the linear transmittance in the other larger incident light angle range. Hereinafter, the angular range between two incident light angles for a linear transmittance as an intermediate value between the maximum linear transmittance and the minimum linear transmittance is referred to as a diffusion region (the width of the diffusion region is referred to as "diffusion width"), whereas the other angular range of incident light is referred to as a non-diffusion region (transmission region). In this regard, referring to FIG. 4, the diffusion region and the non-diffusion region will be described with reference to the anisotropic optical film 20 of tabular structure. FIG. 4 shows the optical profile for the anisotropic optical film 20 of tabular structure in FIG. 3, and as shown in FIG. 4, the angular range of incident light corresponds to a diffusion region between two incident light angles (inside the two incident light angles at the positions of two black points on the optical profile shown in FIG. 4) for the linear transmittance (the linear transmittance of approximately 42% in the example of FIG. 4) as an intermediate value between the maximum linear transmittance (the linear transmittance of approximately 78% in the example of FIG. 4) and the minimum linear transmittance (the linear transmittance of approximately 6% in the example of FIG. 4), whereas the other angular range of incident light corresponds to a non-diffusion region (outside the two incident light angles at the positions of the two black points on the optical profile shown in FIG. 4).

In the case of the anisotropic optical film 10 of columnar structure, as can be seen from the behavior of the transmitted light in FIG. 1(a), the transmitted light has a substantially circular shape, and exhibits substantially identical light diffusibility in the MD direction and the TD direction. More specifically, diffusion is isotropic in the case of the anisotropic optical film 10 of columnar structure. In addition, as shown by the solid line in FIG. 3, the change in light diffusibility (in particular, the optical profile near the boundaries between the non-diffusion region and the diffusion region) is relatively gradual even when the incident light angle is varied, thus producing the effect of causing no rapid change in brightness or no glare. However, the anisotropic optical film 10 is low in linear transmittance in the non-diffusion region as can be seen from a comparison with the optical profile for the anisotropic optical film 20 of tabular structure, which is shown by the broken line in FIG. 3, thus also leading to problems of slightly decreased display characteristics (e.g., brightness and contrast). In addition, the anisotropic optical film 10 of columnar structure also has a problem that the diffusion region has a smaller width as compared with the anisotropic optical film 20 of tabular structure.

On the other hand, in the case of the anisotropic optical film 20 of tabular structure, as can be seen from the behavior of the transmitted light in FIG. 1(b), the transmitted light has a substantially needle-like shape, and has significantly different light diffusibility between in the MD direction and in the TD direction. More specifically, diffusion is anisotropic in the case of the anisotropic optical film 20 of tabular structure. Specifically, in the example shown in FIG. 1(b), the diffusion is wider in the MD direction than in the case of the columnar structure, whereas the diffusion is narrower in the TD direction than in the case of the columnar structure. In addition, as shown by the broken line in FIG. 3, the change in light diffusibility (in particular, the optical profile near the boundaries between the non-diffusion region and the diffusion region) is extremely rapid (in the TD direction in the case of the present embodiment) when the incident light angle is varied, and thus, when the anisotropic optical film 20 is applied to a display device, there is a possibility that a rapid change in brightness and glare will appear, thereby decreasing the visibility. In addition, the anisotropic optical film of tabular structure also has the problem of being likely to cause an interference (bow) of light. However, the anisotropic optical film 20 has a high linear transmittance in the non-diffusion region, and thus has the effect of being able to improving display characteristics.

Problem of Related Art and Summary of Means for Solving the Problem

Next, problems of anisotropic optical films in the related art and means for solving the problems will be described in summary.

Problem of Related Art

The case of using, for a display device, an anisotropic optical film that has only a single anisotropic light diffusion layer the columnar structure or tabular structure as described above has advantages and disadvantages in terms of the linear transmittance in the non-diffusion region, the width of the diffusion region, the diffusion width in the TD direction (or the MD direction), whether a rapid change in brightness or glare is produced or not, and the like. More specifically, the inventors have found a problem that it is difficult for the anisotropic optical film including only a single layer of anisotropic light diffusion layer that has columnar structure or anisotropic light diffusion layer that has a tabular structure to combine, with balance, all of an improved linear transmittance in the non-diffusion region, an expanded diffusion region (diffusion width) in the TD direction (or the MD direction), suppressed rapid change in brightness and glare generation at high levels.

In contrast, there is also an anisotropic optical film where an anisotropic light diffusion layer of columnar structure (corresponding to the "column structure" in Patent Literature 3) and an anisotropic light diffusion layer of tabular structure are stacked as described in Patent Literature 3 above. However, the anisotropic optical film where the anisotropic light diffusion layer of columnar structure and the anisotropic light diffusion layer of tabular structure are merely stacked as in Patent Literature 3 has, because of the use of the anisotropic light diffusion layer of tabular structure, a diffusion width expanded in the MD direction, but still fails to have a diffusion width extended insufficiently in the TD direction, and has the problem of being likely to produce a rapid change in brightness in the TD direction and produce glare. Therefore, it is also difficult for the anisotropic optical film as in Patent Literature 3 to combine, with balance, all of an improved linear transmittance in the non-diffusion region, an expanded diffusion region (diffusion width) in the TD direction (or the MD direction), and suppressed rapid change in brightness and glare generation at high levels.

Summary of Means for Solving Problem in Related Art

In order to solve the problems in question, the inventors have earnestly carried out studies for achieving an anisotropic optical film which combines, with balance, all of an improved linear transmittance in the non-diffusion region, an expanded diffusion region (diffusion width) in the TD direction (or the MD direction), and suppressed rapid change in brightness and glare generation at high levels. As a result, it has been found that it is insufficient to merely stack an anisotropic light diffusion layer of columnar structure (corresponding to the "column structure" in Patent Literature 3) and an anisotropic light diffusion layer of tabular structure as described in Patent Literature 3, and an anisotropic light diffusion layer that has a columnar structure and an anisotropic light diffusion layer that has an intermediate structure with a specific aspect ratio (an aspect ratio that is larger than that of a columnar and smaller than that of a tabular) are stacked, thereby making it possible to achieve an anisotropic optical film which combines, with balance, all of an improved linear transmittance in the non-diffusion region, an expanded diffusion region (diffusion width) in the TD direction (or the MD direction), and suppressed rapid change in brightness and glare generation at high levels. Therefore, the use of such an anisotropic optical film for a display device such as a liquid crystal display device can suppress the rapid change in brightness and the generation of glare while having excellent display characteristics (e.g., brightness and contrast). Hereinafter, an anisotropic optical film according to the present embodiment made on the basis of these findings, will be described in detail.

<<Configuration of Anisotropic Optical Film According to Present Embodiment>>

Figure 5:
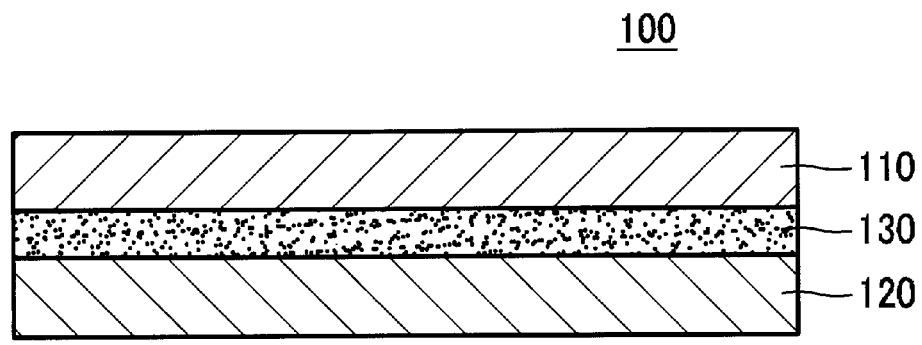
FIG. 5 is a pattern diagram illustrating an example of the overall configuration of an anisotropic optical film according to a preferred embodiment of the present invention.
Figure 6A:
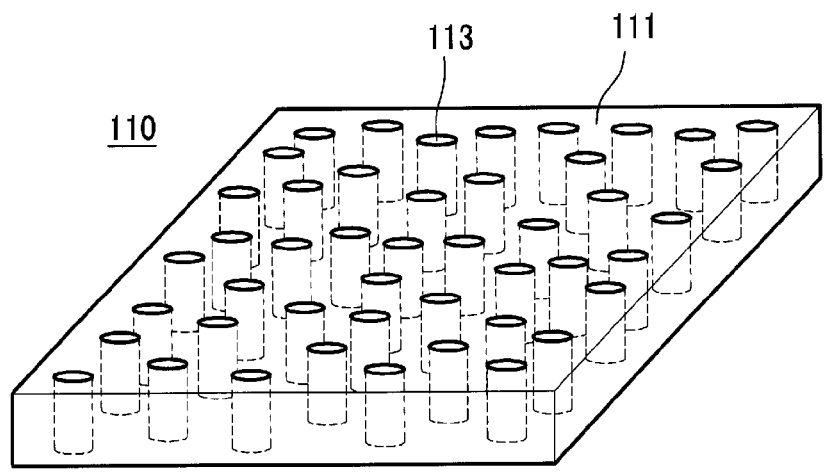
FIGS. 6(a) to 6(c) are pattern diagrams illustrating an example of the configuration of an anisotropic light diffusion layer including a columnar structure in the anisotropic optical film according to the present embodiment, where
Figure 6B:
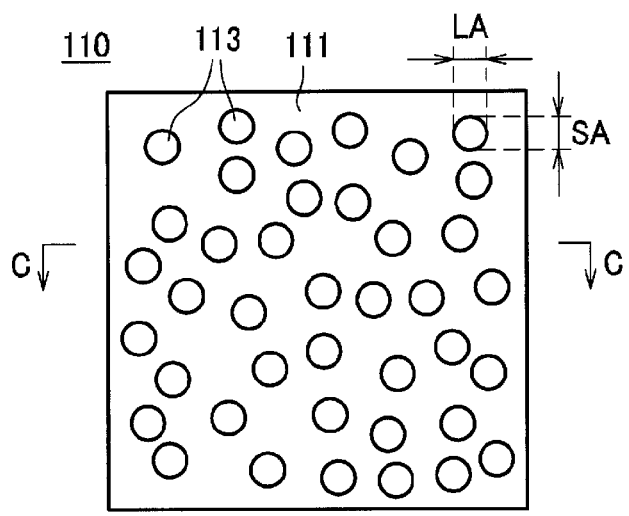
Figure 6C:
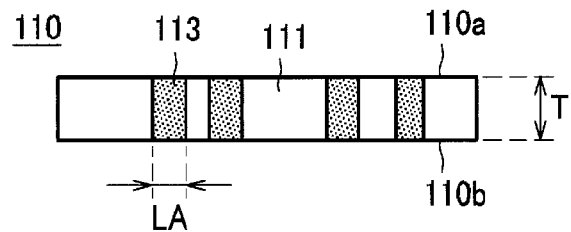
Figure 7A:
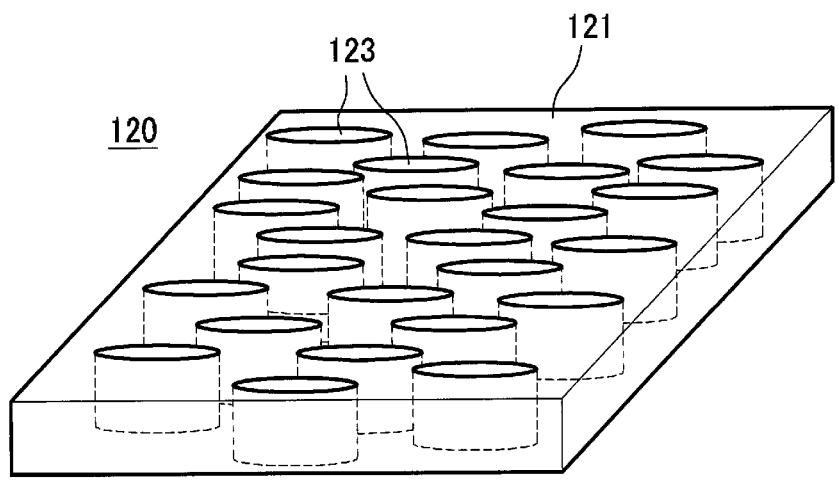
FIGS. 7(a) to 7(c) are pattern diagrams illustrating an example of the configuration of an anisotropic light diffusion layer including an intermediate structure in the anisotropic optical film according to the present embodiment, where
Figure 7B:
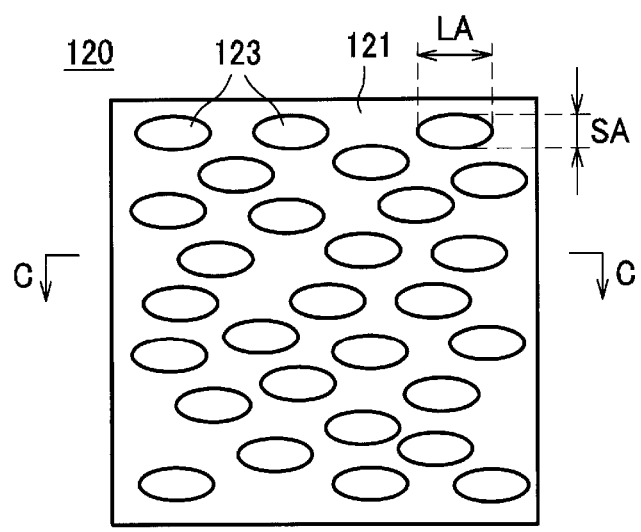
Figure 7C:
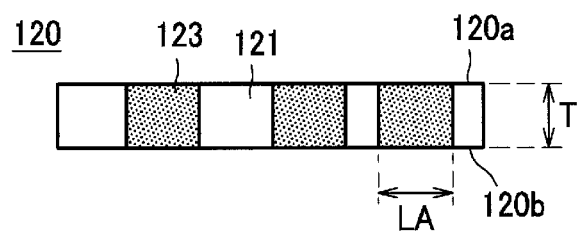

The configuration of an anisotropic optical film 100 according to the present embodiment will be described with reference to FIGS. 5 to 7. FIG. 5 is a pattern diagram illustrating an example of the overall configuration of the anisotropic optical film 100 according to the present embodiment. FIGS. 6(a) to 6(c) are pattern diagrams illustrating an example of the configuration of an anisotropic light diffusion layer 110 in the anisotropic optical film 100 according to the present embodiment, where FIG. 6(a) is a perspective view, FIG. 6(b) is a plan view of pillar regions, and FIG. 6(c) is a sectional view of FIG. 6(b) cut along the line C-C. FIGS. 7(a) to 7(c) are pattern diagrams illustrating an example of the configuration of an anisotropic light diffusion layer 120 in the anisotropic optical film 100 according to the present embodiment, where FIG. 7(a) is a perspective view, FIG. 7(b) is a plan view, and FIG. 7(c) is a sectional view of FIG. 7(b) cut along the line C-C.

<Overall Configuration>

As shown in FIG. 5, the anisotropic optical film 100 is an anisotropic optical film that has the two layers of anisotropic light diffusion layers 110, 120 stacked, which vary in linear transmittance depending on incident light angles. The anisotropic light diffusion layers 110, 120 respectively have matrix regions 111, 121, and multiple pillar regions 113, 123 that differ in refractive index from the matrix regions. In addition, the anisotropic light diffusion layer 110 differs from the anisotropic light diffusion layer 120 in aspect ratio between a short diameter and a long diameter (short diameter/long diameter) at a cross section perpendicular to the orientation directions of the pillar regions 113, 123. More specifically, the anisotropic optical film according to the present invention needs to have, as anisotropic light diffusion layers, at least an anisotropic light diffusion layer (a) that has the columnar structure mentioned above and an anisotropic light diffusion layer (b) that has the intermediate structure mentioned above. The anisotropic optical film 100 according to the present embodiment has, as the anisotropic light diffusion layer (a), the anisotropic light diffusion layer 110 stacked on the upper layer side, and has, as the anisotropic light diffusion layer (b), the anisotropic light diffusion layer 120 stacked on the lower layer side. However, in the present invention, the order of stacking the anisotropic light diffusion layer (a) and the anisotropic light diffusion layer (b) is not particularly limited, but the anisotropic light diffusion layer 110 and anisotropic light diffusion layer 120 according to the present embodiment may be respectively stacked on the lower layer side and the upper layer side. It is to be noted that while the configuration of two anisotropic light diffusion layers stacked is presented in the present embodiment, three or more anisotropic light diffusion layers stacked may be adopted as the anisotropic optical film according to the present invention.

In addition, a transparent pressure-sensitive adhesive layer 130 is further stacked between the respective anisotropic light diffusion layer 110 and 120. This pressure-sensitive adhesive layer 130 may be provided, if necessary. In this regard, when the anisotropic optical film has three or more anisotropic light diffusion layers, the pressure-sensitive adhesive layer may be provided between all of the anisotropic light diffusion layers, the pressure-sensitive adhesive layer may be provided only between some of the anisotropic light diffusion layers, or all of the anisotropic light diffusion layers may be stacked without any pressure-sensitive adhesive layer.

<Anisotropic Light Diffusion Layer 110>

The anisotropic light diffusion layer 110 has the same configuration as the single layer of anisotropic optical film 10 described above, and has a light diffusibility with a linear transmittance varied depending on the incident light angle. In addition, the anisotropic light diffusion layer 110 composed of a cured product of a composition including a photopolymerizable compound has, as shown in FIG. 6, a matrix region 111 and multiple pillar regions 113 that differ in refractive index from the matrix region 111. The orientation directions (extending directions) P of the pillar regions 113 are formed to be parallel to an axis of scattering center, and appropriately determined such that the anisotropic light diffusion layer 110 have a desired linear transmittance and diffusibility. Further, in order for the axis of scattering center to be parallel to the orientation direction of the pillar region, the law of refractive index (Snell's law) only has to be satisfied, and there is no need to be strictly parallel. The Snell's law is that the relation of $n_1 \sin \theta_1 = n_2 \sin \theta_2$ is established between an incident light angle $\theta_1$ and a refraction angle $\theta_2$ when light is incident from a medium with a refractive index $n_1$ to the interface of a medium with a refractive index $n_2$. For example, with $n_1=1$ (air) and $n_2=1.51$ (anisotropic optical film), the orientation direction (refraction angle) of the pillar region is approximately 19° when the tilt (incident light angle) of the axis of scattering center is 30°, and even when the incident light angle is different from the refraction angle as just described, the difference falls into the concept of parallelism in the present embodiment as long as the Snell's law is satisfied.

It is to be noted that the anisotropic light diffusion layer 110 may be adopted where the orientation direction of the pillar region 113 is not coincident with the thickness direction (normal direction) of the film. In this case, the anisotropic light diffusion layer 110 has the property that incident light is intensively diffused in the angular range of incident light (diffusion region) close to a direction of tilt at a predetermined angle from the normal direction (that is, the orientation direction of the pillar region 113), while the diffusion is attenuated to increase the linear transmittance in the other larger angular range of incident light (non-diffusion region).

(Pillar Regions 113)

The pillar regions 113 according to the present embodiment are provided as multiple pillar cured regions in the matrix region 111, and the respective pillar regions 113 are formed such that the respective orientation directions are parallel to the axis of scattering center. Accordingly, the multiple pillar regions 113 in the same anisotropic light diffusion layer 110 are formed to be parallel to each other.

The refractive index of the matrix region 111 has only to be different from the refractive index of the pillar regions 113, but how the refractive indexes are different is not particularly limited, but relatively considered. When the refractive index of the matrix region 111 is lower than the refractive index of the pillar regions 113, the matrix region 111 serves as a low refractive index region. In an opposite manner, when the refractive index of the matrix region 111 is higher than the refractive index of the pillar regions 113, the matrix region 111 serves as a high refractive index region.

Cross-sectional shape of the pillar regions 113 perpendicular to the orientation direction have short diameters SA and long diameters LA as shown in FIG. 6(b). The short diameters SA and the long diameters LA can be confirmed by observing the anisotropic light diffusion layer 110 with an optical microscope (see the plan view). The cross-sectional shapes of the pillar regions 113 is not to be considered particularly limited, as long as the shapes satisfy the aftermentioned range (less than 2) of the aspect ratio. For example, while the cross-sectional shapes of the pillar regions 113 are shown as circular shapes in FIGS. 6(a) and 6(b), the cross-sectional shapes of the pillar regions 113 are not limited to the circular shapes, and may be an elliptic shape, a polygonal shape, an indefinite shape, a mixture thereof, or the like.

The aspect ratio between the short diameter SA and the long diameter LA (=LA/SA) needs to be less than 2. This can achieve the improvement of linear transmittance in the non-diffusion region of the anisotropic optical film 100 and the expansion of the diffusion region (diffusion width) thereof. In order to achieve the effects in a more effective manner, the aspect ratio between the short diameter SA and the long diameter LA at a cross section of the pillar region 113 is preferably less than 1.5, more preferably less than 1.2.

In addition, the length of the short diameter SA at a cross section of the pillar region 113 (the maximum diameter among the short diameters SA of multiple pillar regions 113) preferably has a lower limit of 0.5 μm, more preferably 1.0 μm, and further preferably 1.5 μm or more. There is a possibility that the light diffusibility and the light condensing property may become insufficient as the short diameter SA is smaller. On the other hand, the length of the short diameter SA at a cross section of the pillar region 113 (the maximum diameter among the short diameters SA of multiple pillar regions 113) preferably has an upper limit of 5.0 μm, more preferably 3.0 μm, and further preferably 2.5 μm. There is a possibility that the diffusion range may become narrower as the short diameter SA is larger. The upper limit and lower limit of the short diameter SA of the pillar region 113 can be combined appropriately. For example, the short diameter SA of the pillar region 113 from 0.5 μm to 5.0 μm can make the diffusion range wider, and also provides sufficient light diffusibility and light condensing property.

Furthermore, the length of the long diameter LA at a cross section of the pillar region 113 (the maximum diameter among the long diameters LA of multiple pillar regions 113) preferably has a lower limit of 0.5 μm, more preferably 1.0 μm, and further preferably 1.5 μm or more. There is a possibility that the diffusion range may become narrower as the long diameter LA is smaller. On the other hand, the length of the long diameter LA at a cross section of the pillar region 113 (the maximum diameter among the long diameters LA of multiple pillar regions 113) preferably has an upper limit of 8.0 μm, more preferably 3.0 μm, and further preferably 2.5 μm. As the long diameter LA is larger, there is a possibility that the diffusion range may become narrower, and there is a possibility that the change in diffusibility in the case of varying the incident light angle may become extremely rapid, thereby making glare more likely to be generated. In addition, there is a possibility that light interference (bow) may be made likely to be caused as the long diameter LA is increased. The upper limit and lower limit of the long diameter LA of the pillar region 113 can be combined appropriately. For example, the long diameter LA of the pillar region 113 from 0.5 μm to 8.0 μm can make the diffusion range wider, and also solve the problem with the extremely rapid change in diffusibility in the case of varying the incident light angle, which makes glare more likely to be generated.

It is to be noted that the maximum values for the short diameters SA and long diameters LA of the pillar regions 113 in the present embodiment may be obtained by observing the surface of the anisotropic light diffusion layer 110 with a microscope, observing ten short diameters SA and ten long diameters LA randomly selected, obtaining the maximum values for the diameters. In addition, the value obtained in a way that the maximum value of the long diameter LA obtained above is divided by the maximum value of the short diameter SA is used as the aspect ratio of the pillar region 113.

(Layer Thickness)

The anisotropic light diffusion layer 110 preferably has a thickness T of 15 μm or more and 100 μm or less. The thickness T in the range mentioned above reduces the problem with cost, and makes the image contrast adequate. Furthermore, the thickness T of the anisotropic light diffusion layer 110 preferably has a lower limit of 20 μm or more. There is a possibility that the light diffusibility and the light condensing property may become insufficient as the thickness T is smaller. On the other hand, the thickness T of the anisotropic light diffusion layer 110 preferably has an upper limit of 70 μm or less. As the thickness T is larger, there is a possibility that there may be a problem of increased cost such as high material cost and time required for the manufacture, and increased diffusion in the direction of the thickness T may make images more likely to be blurred, thereby making the contrast more likely to be decreased. The upper limit and lower limit of the thickness T of the anisotropic light diffusion layer 110 can be combined appropriately.

FIG. 6(c) illustrates an upper surface 110a and a lower surface 110b of the anisotropic light diffusion layer 110. The upper surface 110a and the lower surface 110b are provided for the sake of convenience, and reversed (the lower surface and the upper surface) when the anisotropic light diffusion layer 110 is turned over. The upper surface 110a and lower surface 110b of the anisotropic light diffusion layer 110 are preferably different in surface profile. This difference can cause the anisotropic optical film 100 according to the present embodiment to reduce the generation of light interference (bow). The formation of the matrix region 111 and the pillar region 113 by phase separation with light irradiation can achieve a difference in surface profile between the upper surface 110a and the lower surface 110b. It is to be noted that the creation of the anisotropic light diffusion layer 110 by the phase separation may make it difficult to observe either the upper surface 110a or the lower surface 110b with an optical microscope. This is because while the pillar regions 113 are gradually formed from the surface irradiated with light toward the direction of the thickness T, the pillar regions 113 further extend after the pillar regions 113 reach the other surface (the surface on the side opposite to the surface irradiated with light). In such a case, the observation of the other surface with an optical microscope makes the pillar regions 113 more likely to be confirmed.

In the present embodiment, the interfaces between the pillar regions 113 and the matrix region 111 are preferably configured to be continuously present entirely in the direction of the thickness T of the single anisotropic diffusion layer 110 (Z direction). The continuously configured interfaces between the pillar regions 113 and the matrix region 111 makes light diffusion and light condensing more likely to be continuous while passing through the anisotropic light diffusion layer 110, thereby increasing the efficiencies of light diffusion and light condensing. On the other hand, when the pillar regions 113 and the matrix region 111 are mostly present in a patchy fashion like plaques at a cross section of the anisotropic light diffusion layer 110, the light condensing property is made unfavorably less likely to be achieved.

<Anisotropic Light Diffusion Layer 120>

The anisotropic light diffusion layer 120 has the same configuration as the single layer of anisotropic optical film 30 described above, and has a light diffusibility of varying in linear transmittance depending on the incident light angle. In addition, as shown in FIGS. 7(a) to 7(c), the anisotropic light diffusion layer 120, composed of a cured product of a composition including a photopolymerizable compound, has a matrix region 121 and multiple pillar regions 123 that differs in refractive index from the matrix region 121. The multiple pillar regions 123 and the matrix region 121, which have irregular distributions and shapes, are formed over the entire surface of the anisotropic light diffusion layer 120, and optical characteristics (for example, linear transmittance and the like) obtained are thus substantially identical when the characteristics are measured at any site. The multiple pillar regions 123 and the matrix region 121 have irregular distributions and shapes, and the anisotropic light diffusion layer 120 according to the present embodiment is thus less likely to cause light interference (bow). Such structures can be formed by, although described later in detail, for example, providing a composition including a photopolymerizable compound in the form of a sheet, and irradiating the sheet with light rays parallel to a desired axis of scattering center from a light source, thereby curing the composition, and the parts irradiated with the light rays serve as the pillar regions 123, whereas the parts irradiated with no light ray serves as the matrix regions 121.

(Pillar Region 123)

The pillar regions 123 according to the present embodiment are provided as numbers of pillar cured regions in the matrix regions 121, and the respective pillar regions 123 are formed such that the respective orientation directions are parallel to the axes of scattering center. Accordingly, the number of pillar regions 123 in the same anisotropic light diffusion layer 120 is formed to be parallel to each other.

The refractive index of the matrix region 121 has only to be different from the refractive index of the pillar regions 123, and how the refractive indexes are different is not limited, but considered to be relative. When the refractive index of the matrix region 121 is lower than the refractive index of the pillar regions 123, the matrix region 121 serves as a low refractive index region. Inversely, when the refractive index of the matrix region 121 is higher than the refractive index of the pillar regions 123, the matrix region 121 serves as a high refractive index region. In this regard, the refractive index at the interface between the matrix region 121 and the pillar region 123 preferably changes gradually increasingly. The gradually increasing change makes the problems unlikely to be caused, which are extremely rapid change in diffusibility in the case of varying the incident light angle and more likely generation of glare. The formation of the matrix region 121 and the pillar region 123 by phase separation with light irradiation can change the refractive index at the interface between the matrix region 121 and the pillar region 123 gradually increasingly.

Cross-sectional shape of the pillar regions 123 perpendicular to the orientation direction have short diameters SA and long diameters LA as shown in FIG. 7(b). The short diameters SA and the long diameters LA can be confirmed by observing the anisotropic light diffusion layer 120 with an optical microscope (see the plan view). The cross-sectional shapes of the pillar regions 123 is not to be considered particularly limited, as long as the shapes satisfy the after-mentioned range (2 or more and 20 or less) of the aspect ratio. For example, while the cross-sectional shapes of the pillar regions 123 are shown as elliptic shapes in FIGS. 7(a) and 7(b), the cross-sectional shapes of the pillar regions 123 are not limited to the elliptic shapes, and may be a polygonal shape, a corrugated shape, an indefinite shape, a mixture thereof, or the like.

In addition, the cross-sectional shapes of the pillar regions 123 in the orientation direction thereof are formed such that the pillar regions 123 and the matrix region 121 are alternated as shown in FIG. 7(c). While FIG. 7(c) shows an embodiment in which the pillar regions 123 extend linearly in the direction of the thickness T, the regions may be linear, corrugated, or flexed, or may have a mixture of the shapes.

The aspect ratio between the short diameter SA and the long diameter LA (=LA/SA) needs to be 2 or more and 20 or less. This can achieve a balance between a high linear transmittance in the non-diffusion region and large diffusion regions in the MD direction and the TD direction in the anisotropic optical film 100. In addition, there is a possibility that the maximum linear transmittance at the incident light angle for maximizing the linear transmittance may become lower as the aspect ratio between the short diameter SA and the long diameter LA is lower at cross sections of the pillar regions 123, and the aspect ratios of the pillar regions 123 are thus adjusted to 2 or more. On the other hand, the aspect ratio between the short diameter SA and the long diameter LA preferably has an upper limit of 10 or less, and more preferably 5 or less. There is a possibility that the light diffusion range may become narrower as the aspect ratio is higher. In addition, there is a problem that light interference (bow) is more likely to be produced as the aspect ratio is higher. The upper limit and lower limit of the aspect ratio can be combined appropriately. For example, the aspect ratios of the pillar regions 123 from 2 to 20 can expand the diffusion range of the anisotropic optical film 100, and also makes the problem unlikely to be caused with extremely rapid change in brightness in the case of varying the incident light angle, which makes glare more likely to be generated.

In addition, the length of the short diameter SA at a cross section of the pillar region 123 (the maximum diameter among the short diameters SA of multiple pillar regions 123) preferably has a lower limit of 0.5 µm, more preferably 1.0 µm, and further preferably 1.5 µm or more. There is a possibility that the light diffusibility and the light condensing property may become insufficient as the short diameter SA is smaller. On the other hand, the length of the short diameter SA at a cross section of the pillar region 123 (the maximum diameter among the short diameters SA of multiple pillar regions 123) preferably has an upper limit of 5.0 µm, more preferably 3.0 µm, and further preferably 2.5 µm or more. There is a possibility that the diffusion range may become narrower as the short diameter SA is larger. The upper limit and lower limit of the short diameter SA of the pillar region 123 can be combined appropriately. For example, the short diameter SA of the pillar region 123 from 0.5 µm to 5.0 µm can make the diffusion range wider, and also provides sufficient light diffusibility and light condensing property.

Furthermore, the length of the long diameter LA at a cross section of the pillar region 123 (the maximum diameter among the long diameters LA of multiple pillar regions 123) preferably has a lower limit of 1.0 µm. There is a possibility that the diffusion range in the MD direction may become narrower as the long diameter LA is smaller. On the other hand, the length of the long diameter LA at a cross section of the pillar region 123 (the maximum diameter among the long diameters LA of multiple pillar regions 123) preferably has an upper limit of 40 µm, more preferably 20 µm, and further preferably 10 µm. As the long diameter LA is larger, there is a possibility that the diffusion range in the TD direction may become narrower, and there is a possibility that the change in diffusibility in the case of varying the incident light angle may become extremely rapid, thereby making glare more likely to be generated. In addition, there is a possibility that light interference (bow) may be made likely to be caused as the long diameter LA is increased. The upper limit and lower limit of the long diameter LA of the pillar region 123 can be combined appropriately. For example, the long diameter LA of the pillar region 123 from 1.0 µm to 40 µm can make the diffusion range wider, and also makes the problem unlikely to be caused with extremely rapid change in brightness in the case of varying the incident light angle, which makes glare more likely to be generated.

It is to be noted that the maximum values for the short diameters SA and long diameters LA of the pillar regions 123 in the present embodiment may be obtained by observing a cross section of the anisotropic light diffusion layer 120 with a microscope, observing ten short diameters SA and ten long diameters LA randomly selected, obtaining the maximum values for the diameters. In addition, the value obtained in a way that the maximum value of the long diameter LA obtained above is divided by the maximum value of the short diameter SA is used as the aspect ratio of the pillar region 123.

(Layer Thickness)

The anisotropic light diffusion layer 120 is preferably 15 µm or more and 100 µm or less in thickness T. The thickness T in the range mentioned above reduces the problem with cost, and makes the image contrast adequate. Furthermore, the thickness T of the anisotropic light diffusion layer 120 more preferably has a lower limit of 20 µm or more. There is a possibility that the light diffusibility and the light condensing property may become insufficient as the thickness T is smaller. On the other hand, the thickness T of the anisotropic light diffusion layer 120 more preferably has an upper limit of 70 µm or less. As the thickness T is larger, there is a possibility that there may be a problem of increased cost such as high material cost and time required for the manufacture, and increased diffusion in the direction of the thickness T may make images more likely to be blurred, thereby making the contrast more likely to be decreased. The upper limit and lower limit of the thickness T of the anisotropic light diffusion layer 120 can be combined appropriately.

It is to be noted that the same applies in other respects as in the case of the anisotropic light diffusion layer 110 described above, and detailed descriptions of the respects will be thus left out herein.

<Linear Transmittance>

The anisotropic light diffusion layer 110 refers to the layer corresponding to anisotropic light diffusion layer (a) that is a layer including a columnar structure (including pillar regions with an aspect ratio of less than 2) as described above. In this regard, when the linear transmittance of incident light onto the anisotropic light diffusion layer 110 at an incident light angle for maximizing the linear transmittance is defined as a "maximum linear transmittance", the anisotropic light diffusion layer 110 preferably has a maximum linear transmittance of 20% or more and less than 60%. The maximum linear transmittance of the anisotropic light diffusion layer 110 more preferably has an upper limit of 30% or less. On the other hand, the maximum linear transmittance of the anisotropic light diffusion layer 110 more preferably has a lower limit of 50% or more.

In addition, when the linear transmittance of incident light onto the anisotropic light diffusion layer 110 at an incident light angle for minimizing the linear transmittance is defined as a "minimum linear transmittance", the anisotropic light diffusion layer 110 preferably has a minimum linear transmittance of 20% or less. The minimum linear transmittance of the anisotropic light diffusion layer 110 more preferably has an upper limit of 10% or less. The lowered minimum linear transmittance indicates that the linear transmitted light quantity is decreased (the haze value is increased). Therefore, the lowered minimum linear transmittance indicates that the amount of diffused light is increased. The minimum linear transmittance of the anisotropic light diffusion layer 110 is preferably lower. The lower limit is not limited, but for example, 0%.

The anisotropic light diffusion layer 120 refers to the layer corresponding to anisotropic light diffusion layer (b) that is a layer including an intermediate structure (including pillar regions with an aspect ratio in the range of 2 or more and 20 or less) as described above. In this regard, when the linear transmittance of incident light onto the anisotropic light diffusion layer 120 at an incident light angle for maximizing the linear transmittance is defined as a "maximum linear transmittance", the anisotropic light diffusion layer 120 preferably has a maximum linear transmittance of 30% or more and less than 95%. The maximum linear transmittance of the anisotropic light diffusion layer 120 more preferably has an upper limit of 80% or less, and further preferably 70% or less. On the other hand, the maximum linear transmittance of the anisotropic light diffusion layer 120 more preferably has a lower limit of 40% or more, and further preferably 50% or more.

In addition, when the linear transmittance of incident light onto the anisotropic light diffusion layer 120 at an incident light angle for minimizing the linear transmittance is defined as a "minimum linear transmittance", the anisotropic light diffusion layer 120 preferably has a minimum linear transmittance of 25% or less. The minimum linear transmittance of the anisotropic light diffusion layer 120 more preferably has an upper limit of 20% or less, and further preferably 15% or less. The minimum linear transmittance of the anisotropic light diffusion layer 120 is preferably lower as in the case of the anisotropic light diffusion layer 110. The lower limit is not limited, but for example, 0%.

The adjustment of the maximum linear transmittance and the minimum linear transmittance in the ranges mentioned above for the anisotropic light diffusion layer 110 (corresponding to the anisotropic light diffusion layer (a) that is relatively higher in linear transmittance) and the anisotropic light diffusion layer 120 (corresponding to the anisotropic light diffusion layer (b) that is relatively higher in diffusion intensity) makes it possible to achieve a balance between the further improved linear transmittance in the non-diffusion region and the further expanded diffusion region (diffusion width) in the anisotropic optical film 100. Further, the rapid change in brightness in the case of varying the incident light angle and glare can be also made less likely to be produced. In addition, appropriate anisotropy can be achieved, and the range in application of the anisotropic optical film 100 can be thus extended. For example, in the case of using the anisotropic optical film 100 for a display device, excessively strong anisotropy has the problem of being likely to provide insufficient light diffusion and condensing properties in the TD direction, while being in excellent in light diffusion and condensing properties in the MD direction. The anisotropic optical film 100 according to the present embodiment has the maximum linear transmittance mentioned above, and thus has sufficient light diffusion and condensing properties in the TD direction while maintain excellent light diffusion and condensing properties in the MD direction.

In this regard, the linear transmitted light quantity and the linear transmittance can be measured by the method shown in FIG. 2. More specifically, the linear transmitted light quantity and the linear transmittance are measured (the normal direction is regarded as 0°) for each incident light angle, in such a way that the axis of rotation L shown in FIG. 2 is made coincident with the axes C-C shown in FIGS. 6(b) and 7(b). From the obtained data, an optical profile is obtained, and the maximum linear transmittance and the minimum linear transmittance can be figured out from the optical profile.

In addition, the maximum linear transmittance and minimum linear transmittance for the anisotropic light diffusion layers 110, 120 can be adjusted with design parameters for manufacture. Examples of the parameters include the composition of a coating film, the film thickness of a coating film, and a temperature applied to a coating film in the formation of a structure. The maximum linear transmittance and the minimum linear transmittance are changed by appropriately selecting and blending components for the composition for a coating film. As for the design parameters, the maximum linear transmittance and the minimum linear transmittance are more likely to be decreased as the film thickness is larger, and more likely to be increased as the thickness is smaller. The maximum linear transmittance and the minimum linear transmittance are more likely to be decreased as the temperature is higher, and more likely to be increased as the temperature is lower. The combination of the parameters makes it possible to appropriately adjust each of the maximum linear transmittance and the minimum linear transmittance.

In accordance with the method mentioned above, the maximum linear transmittance and minimum linear transmittance are figured out for each anisotropic light diffusion layer (the anisotropic light diffusion layers 110, 120 in the present embodiment), and the linear transmittances are figured out as intermediate values between the maximum linear transmittance and the minimum linear transmittance. On the optical profile, a straight line of the linear transmittance as intermediate values is created, two points of intersection between the line and the optical profile are obtained, and the incident light angles corresponding to the intersection points are read out. In the optical profile, the normal direction is regarded as 0°, and the incident light angle is shown in a negative direction and a positive direction. Therefore, the incident light angle and the incident light angles corresponding to the intersection points may have minus values. When the values of the two intersection points have a plus incident light angle value and a minus incident light angle value, the sum of the absolute value of the minus incident light angle value and the plus incident light angle value is regarded as the angular range (diffusion width) of the incident light diffusion region. When the values of the two intersection points both have plus values, the difference obtained by subtracting the smaller value from the larger value is regarded as a diffusion width of incident light. When the values of the two intersection points both have minus values, the difference obtained by obtaining the respective absolute values and subtracting the smaller value from the larger value is regarded as a diffusion width of incident light.

The diffusion region which is an angular range between the two incident light angles for the linear transmittances as intermediate values between the maximum linear transmittance and the minimum linear transmittance preferably has a width (diffusion width) of 20° or more in both the MD direction and the TD direction in the anisotropic optical film 100. When the diffusion range of incident light has an angular range of smaller than 20°, a rapid change in brightness and glare are more likely to be produced. In order to enhance the effect of suppressing the rapid change in brightness and suppressing glare, the diffusion widths in the MD direction and the TD direction are more preferably 30° or more, and further preferably 40° or more. On the other hand, the upper limits of the diffusion widths in the MD direction and the TD direction are not particularly limited, but there is a possibility that the light condensing property may be damaged in excess of 60°.

<Axis of Scattering Center>

Figure 8:
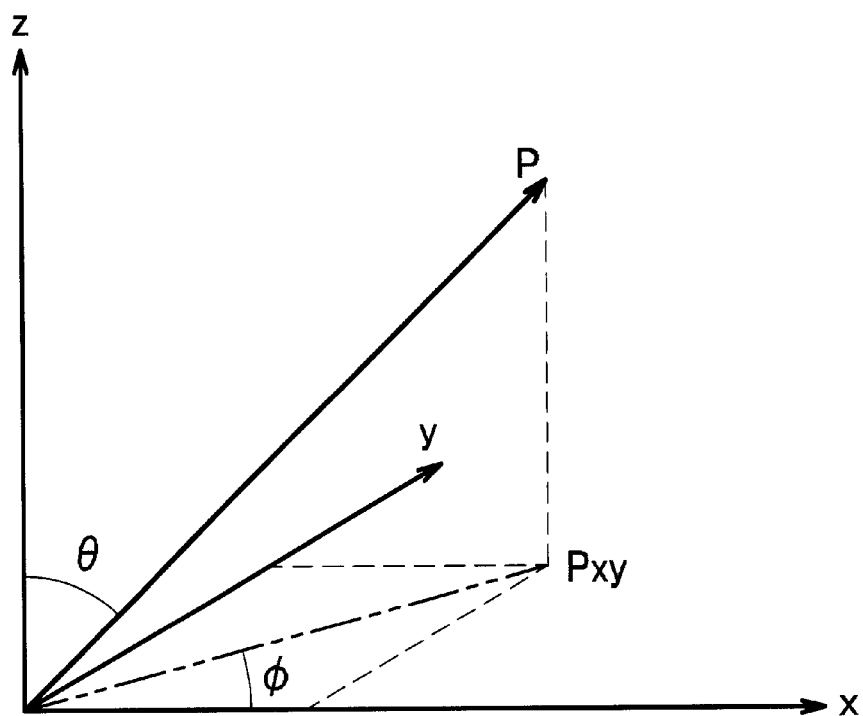
FIG. 8 is a three-dimensional polar coordinate expression for explaining an axis of scattering center in anisotropic light diffusion layers according to the embodiment.

Next, an axis of scattering center P in the anisotropic light diffusion layers 110, 120 will be described with reference to FIG. 8. FIG. 8 is a three-dimensional polar coordinate expression for explaining the axis of scattering center P in the anisotropic light diffusion layers 110, 120.

The anisotropic light diffusion layers 110, 120 each have at least one axis of scattering center, and the axis of scattering center means, as described above, a direction that is coincident with the incident light angle of light of which a light diffusibility is substantially symmetric property with respect to the incident light angle, when the incident light angle onto the anisotropic light diffusion layer 110, 120 is varied. It is to be noted that the incident light angle in this case refers to a substantially central part sandwiched between minimum values (a central part in the diffusion region) on an optical profile measured for the anisotropic light diffusion layer 110, 120.

In addition, the axis of scattering center can be expressed by a polar angle θ and an azimuth angle φ when the surface of the anisotropic light diffusion layer 110, 120 is regarded as an xy plane while the normal line is regarded as a z axis according to the three-dimensional polar coordinate expression as shown in FIG. 8. More specifically, $P_{xy}$ in FIG. 8 can be considered as the length direction of the axis of scattering center projected onto the surface of the anisotropic light diffusion layer 110, 120.

In this regard, when the polar angle θ (−90°<θ<90°) between the normal line (the z axis shown in FIG. 8) of the anisotropic light diffusion layer 110, 120 and the axis of scattering center P is defined as the angle of the axis of scattering center, the absolute value of the difference is preferably 0° or more and 30° or less between the angle of the axis of scattering center for the anisotropic light diffusion layer 110 (corresponding to the anisotropic light diffusion layer (a) that has the columnar structure) and the angle of the axis of scattering center for the anisotropic light diffusion layer 120 (corresponding to the anisotropic light diffusion layer (b) that has the intermediate structure). The absolute value of the difference between the angles of the axes of scattering center within the range mentioned above makes it possible to further expand the width of the diffusion region without decreasing the linear transmittance in the non-diffusion region of the anisotropic optical film 100. In order to achieve this effect in a more effective manner, the absolute value of the difference is more preferably 0° or more and 20° or less, and further preferably 10° or more and 20° or less between the angle of the axis of scattering center for the anisotropic light diffusion layer 110 and the angle of the axis of scattering center for the anisotropic light diffusion layer 120. It is to be noted that the angles of the axes of scattering center for the anisotropic light diffusion layers 110, 120 can be adjusted to desired angles by changing the directions of light rays for irradiating the composition including the photopolymerizable compound in the form of the sheet. It is to be noted that the positive and negative of the angle of the axis of scattering center shall be defined as "+" when the axis of scattering center is sloped to one side and as "−" when the axis is sloped to the other side, with respect to a plane passing through both a predetermined axis of symmetry in the planar direction of the anisotropic light diffusion layer 110, 120 (for example, axes in the MD direction, which pass through the centers of gravity in the anisotropic light diffusion layers 110, 120) and the normal line of the anisotropic light diffusion layer 110, 120.

In addition, in addition to the fact that the absolute value of the difference between the angles of the axes of scattering center (polar angles) satisfies the range mentioned above, the absolute value of the difference is preferably 0° or more and 20° or less between the azimuth angle of the axis of scattering center for the anisotropic light diffusion layer 110 and the azimuth angle of the axis of scattering center for the anisotropic light diffusion layer 120. This makes it possible to further expand the width of the diffusion region without decreasing the linear transmittance in the non-diffusion region of the anisotropic optical film 100.

In this regard, the anisotropic light diffusion layers 110, 120 may each have, in the single layer, multiple groups of pillar regions (each including an assembly of pillar regions that have an identical tilt) that differ in tilt. As just described, when there are multiple groups of pillar regions that differ in tilt in a single layer, there are also multiple axes of scattering center in response to the tilt for each group of pillar regions. When there are multiple axes of scattering center, at least one axis of scattering center among the multiple axes of scattering center has only to meet the above-mentioned condition for the angle of the axis of scattering center. For example, when the anisotropic light diffusion layer 110 have two axes of scattering center P1, P2, whereas the anisotropic light diffusion layer 120 have two axes of scattering center P3, P4, the difference between at least either one angle of the axes of scattering center P1 and P2 and at least either one angle of the axes of scattering center P3 and P4 preferably has an absolute value of 0° or more and 30° or less. The absolute value of the difference between the angles of the axes of scattering center more preferably has a lower limit of 5°. On the other hand, the absolute value of the difference between the angles of the axes of scattering center more preferably has an upper limit of 20°, and further preferably 15°.

In addition, the polar angles θ of the axes of scattering center P (that is, the angle of the axis of scattering center) for the respective anisotropic light diffusion layers 110, 120 are preferably ±10 to 60°, more preferably ±30 to 45°. When the angle of the axis of scattering center is more than −10° and less than +10°, it is impossible to sufficiently improve the contrast or brightness of a display panel including a liquid crystal display device. On the other hand, when the angle of the axis of scattering center is more than +60° or less than −60°, there is a need to irradiate the composition including the photopolymerizable compound, which is provided in the form of a sheet, with light at an great tilt in the manufacturing process, which is not preferred because the inefficiency of irradiation light absorption is disadvantageous in manufacturing.

<Refractive Index>

The anisotropic light diffusion layers 110, 120 are obtained by the composition including the photopolymerizable compound, and the following combinations are able to be used as the composition.

(1) a composition that uses a single photopolymerizable compound as will be described later
(2) a composition that uses a mixture of multiple photopolymerizable compounds as will be described later
(3) a composition that uses a mixture of the single or multiple photopolymerizable compounds and a non-photopolymerizable polymer compound In each of the foregoing combinations, the light irradiation is presumed to form, on a micron scale, microscopic structures that differ in refractive index in the anisotropic light diffusion layers 110, 120, which is believed to show unique anisotropic light diffusion characteristics as presented in the present embodiment. Accordingly, the change in refractive index is preferably larger between before and after photopolymerization in the case (1), and it is preferable to combine multiple materials that differ in refractive index in the case of (2) and (3). It is to be noted that the change in refractive index or the difference in refractive index herein refers to a change or a difference of, specifically, 0.01 or more, preferably 0.05 or more, more preferably 0.10 or more.

<Thickness of Each Layer in the Case of Three or More Anisotropic Light Diffusion Layers Stacked>

When the anisotropic optical film has three or more anisotropic light diffusion layers, each anisotropic light diffusion layer is preferably 15 μm or more and 100 μm or less in thickness.

<Linear Transmittance of Each Layer in the Case of Three or More Anisotropic Light Diffusion Layers Stacked>

When the anisotropic optical film has three or more anisotropic light diffusion layers, each anisotropic light diffusion layer preferably has a maximum linear transmittance of 20% or more and less than 95%, and a minimum linear transmittance of 25% or less.

<Other Embodiment of Anisotropic Optical Film>

The anisotropic optical film 100 according to the present embodiment is obtained by stacking multiple anisotropic light diffusion layers (the anisotropic light diffusion layers 110, 120 according to the present embodiment) including a cured product of the composition including the photopolymerizable compound, and the stacked body may be stacked on a light-transmitting base, or light-transmitting bases may be stacked on both sides of the stacked body. In this regard, as the light-transmitting base, a base with higher transparency is favorable, a base with a total light transmittance (JIS K7361-1) of 80% or more, more preferably 85% or more, most preferably 90% or more can be used in a preferred manner, and a base with a haze value (JIS K7136) of 3.0 or less, more preferably 1.0 or less, most preferably 0.5 or less can be used in a preferred manner. Specifically, it is possible to use, as the light-transmitting base, a transparent plastic film, a glass plate, or the like, and a plastic film is preferred in terms of thinness, lightness, chip-proof property, excellence in productivity. Specific examples include polyethylene terephthalate (PET), polyethylene naphthalate (PEN), triacetyl cellulose (TAC), polycarbonate (PC), polyethersulfone (PES), cellophane, polyethylene (PE), polypropylene (PP), polyvinyl alcohol (PVA), and cycloolefin resin, which can be used alone or in mixture, and further in a stack. In addition, the thickness of the light-transmitting base is, in consideration of use application and productivity, preferably 1 μm to 5 mm, more preferably 10 to 500 μm, and further preferably 50 to 150 μm.

In addition, the anisotropic optical film according to the present invention may be an anisotropic optical film with other layer provided on one surface of the anisotropic light diffusion layer 110 or 120. Examples of the other layer can include, for example, a polarization layer, a light diffusion layer, a low reflection layer, an antifouling layer, an antistatic layer, an ultraviolet-near-infrared rays (NIR) absorption layer, a neon-cut layer, and an electromagnetic shielding layer. Other layers may be stacked sequentially. Furthermore, other layers may be stacked both surfaces of the anisotropic light diffusion layer 110 and/or 120. The other layers stacked on the both surfaces may be layers that have the same function, or layers that have separate functions.

<<Production Method for Anisotropic Optical Film According to Present Embodiment>>

While the configuration of the anisotropic optical film 100 according to the present embodiment has been described above in detail, a method for manufacturing the thus configured anisotropic optical film 100 will be subsequently described.

The anisotropic optical film 100 according to the present embodiment is obtained by stacking the anisotropic light diffusion layers 110, 120 in a direct manner or with the pressure-sensitive adhesive layer 130 interposed therebetween, and the respective anisotropic light diffusion layers 110, 120 can be manufactured by irradiating a specific photo-curable composition layer with light rays such as UV under a special condition. Hereinafter, raw materials for the anisotropic light diffusion layers 110, 120 will be described first, and a manufacturing process will be then described.

<Raw Materials for Anisotropic Light Diffusion Layer>

The raw materials for the anisotropic light diffusion layers 110, 120 will be described in the order of: (1) photopolymerizable compound; (2) photoinitiator; (3) blend proportion; and other optional component.

(Photopolymerizable Compound)

The photopolymerizable compound which is a material for forming the anisotropic light diffusion layers 110, 120 according to the present embodiment is a material composed of: a photopolymerizable compound selected from a macromonomer, a polymer, an oligomer, or a monomer having a radical-polymerizable or cationic polymerizable functional group; and a photoinitiator, and polymerized and cured by irradiation with ultraviolet ray and/or visible ray. In this regard, even when it is one type of material that constitutes the anisotropic light diffusion layers 110, 120, and the other anisotropic light diffusion layers included in the anisotropic optical film 100, a difference in refractive index is produced by the production a difference in density. This is because a part irradiated at a high UV irradiation intensity has a high curing rate, thus causing the polymerization-curing material to move to the vicinity of the cured region, and resulting in the formation of a higher refractive index region and a lower refractive index region. It is to be noted that the term of (meth)acrylate means either an acrylate or a methacrylate.

The radial-polymerizable compound mainly contains one or more unsaturated double bonds in a molecule, and specific examples of the compound include acrylic oligomers referred to as, e.g., epoxy acrylate, urethane acrylate, polyester acrylate, polyether acrylate, polybutadiene acrylate, silicone acrylate; and acrylate monomers such as 2-ethylhexyl acrylate, isoamyl acrylate, butoxyethyl acrylate, ethoxy diethyleneglycol acrylate, phenoxyethyl acrylate, tetrahydrofurfuryl acrylate, isonorbornyl acrylate, 2-hydroxyethyl acrylate, 2-hydroxypropyl acrylate, 2-acryloyloxyphthalic acid, dicyclopentenyl acrylate, triethylene glycol diacrylate, neopentyl glycol diacrylate, 1,6-hexanediol diacrylate, EO adduct diacrylate of bisphenol A, trimethylolpropane triacrylate, EO modified trimethylolpropane triacrylate, pentaerythritol triacrylate, pentaerythritol tetraacrylate, ditrimethylolpropane tetraacrylate, and dipentaerythritol hexaacrylate. In addition, these compounds may be each used alone, or two or more of the compounds may be used in mixture. It is to be noted that while it is also use to methacrylates, acrylates are typically preferred rather than methacrylates because of higher photopolymerization rates.

A compound having one or more epoxy groups, vinyl ether groups, or oxetane groups in a molecule can be used as the cationic polymerizable compound. Examples of the compound having an epoxy group include 2-ethylhexyl diglycol glycidyl ether, glycidyl ether of biphenyl, diglycidyl ethers of bisphenols such as bisphenol A, hydrogenated bisphenol A, bisphenol F, bisphenol AD, bisphenol S, tetramethyl bisphenol A, tetramethyl bisphenol F, tetrachlorobisphenol A, tetrabromobisphenol A, polydiglycidyl ethers of novolac resins such as phenol novolac, cresol novolac, brominated phenol novolac, and ortho-cresol novolac, diglycidyl ethers of alkylene glycols such as ethylene glycol, polyethylene glycol, polypropylene glycol, butanediol, 1,6-hexanediol, neopentyl glycol, trimethylol propane, 1,4-cyclohexane dimethanol, EO adducts of bisphenol A, and PO adducts of bisphenol A, glycidyl esters such as a glycidyl ester of hexahydrophthalic acid and a glycidyl ester of dimer acid.

The examples of the compound having an epoxy group include further include, but not limited thereto, alicyclic epoxy compounds such as 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, (3,4-epoxycyclohexylmethyl)adipate, di(3,4-epoxy-6-methylcyclohexylmethyl)adipate, 3,4-epoxy-6-methylcyclohexyl-3',4'-epoxy-6'-methyl cyclohexanecarboxylate, methylenebis(3,4-epoxycyclohexane), dicyclopentadienediepoxide, di(3,4-epoxycyclohexylmethyl)ether of ethylene glycol, ethylenebis(3,4-epoxycyclohexanecarboxylate), lactone-modified 3,4-epoxycyclohexylmethyl-3',4'-epoxycyclohexanecarboxylate, tetra(3,4-epoxycyclohexylmethyl)butanetetracarboxylate, and di(3,4-epoxycyclohexylmethyl)-4,5-epoxytetrahydrophthalate.

Examples of the compound having a vinyl ether group include, but not limited thereto, for example, diethylene glycol divinyl ether, triethylene glycol divinyl ether, butanediol divinyl ether, hexanediol divinyl ether, cyclohexanedimethanol divinyl ether, hydroxybutyl vinyl ether, ethyl vinyl ether, dodecyl vinyl ether, trimethylolpropane trivinyl ether, and propenyl ether propylenecarbonate. It is to be noted that vinyl ether compounds are typically cationic polymerizable, but also able to achieve radical polymerization in combination with acrylates.

In addition, 1,4-bis[(3-ethyl-3-oxetanylmethoxy)methyl] benzene, 3-ethyl-3-(hydroxymethyl)-oxetane, or the like can be used as the compound having an oxetane group.

Further, the foregoing cationic polymerizable compounds may be each used alone, or two or more of the compounds may be used in mixture. The photopolymerizable compound is not limited to the foregoing. In addition, in order to produce an adequate difference in refractive index, into the photopolymerizable compound, fluorine atoms (F) may be introduced for the purpose of decreasing the refractive index, or sulfur atoms (S), bromine atoms (Br), and various types of metal atoms may be introduced for the purpose of increasing the refractive index. Furthermore, as disclosed in JP 2005-514487 A, it is also effective to add, to the photopolymerizable compound described above, functional ultrafine particles of a high refractive index metal oxide such as a titanium oxide ($TiO_2$), a zirconium oxide ($ZrO_2$), and a tin oxide ($SnO_x$) with a photopolymerizable functional group such as an acrylic group, a methacryl group, or an epoxy group introduced to the surfaces of the ultrafine particles.

[Photopolymerizable Compound Having Silicone Skeleton]

In the present embodiment, it is preferable to use, as the photopolymerizable compound, a photopolymerizable compound having a silicone skeleton. The photopolymerizable compound having a silicone skeleton forms the low refractive index region, the high refractive index region, or the low refractive index region and the high refractive index region, through polymerization and curing with orientation based on the structure (mainly ether linkages) of the compound. The use of the photopolymerizable compound having a silicone skeleton makes it easy to slope the pillar regions 113, 123, thereby improving the light condensing property in the front direction. It is to be noted that the low refractive index region corresponds to any one of the pillar regions 113, 123 or the matrix regions 111, 121, whereas the other corresponds to the high refractive index region.

In the low refractive index region, there is preferably a relatively large amount of silicone resin that is a cured product of the photopolymerizable compound having a silicone skeleton. This can make it further easy to slope the axes of scattering centers, thus improving the light condensing property in the front direction. The silicone resin contains more silica (Si) as compared with compounds having no silicone skeleton, and the use of an EDS (energy dispersive X-ray spectrometer) with the silica as an index can thus confirm the relative amount of the silicone resin.

The photopolymerizable compound having a silicone skeleton is a monomer, an oligomer, a prepolymer, or a macromonomer having a radical-polymerizable or cationic-polymerizable functional group. Examples of the radical-polymerizable functional group include an acryloyl group, a methacryloyl group, and an allyl group, and examples of the cationic-polymerizable functional group include an epoxy group and an oxetane group. The types or numbers of the functions are not particularly limited, but it is preferable to have a multifunctional acryloyl group or methacryloyl group, because a larger number of functional groups is more likely to increase the crosslink density, and produce a difference in refractive index, which is preferred. In addition, the compound having a silicone skeleton may be, because of the structure thereof, insufficient in terms of compatibility with other compounds, but in such a case, can be turned into a urethane to increase the compatibility. In the present embodiment, a silicone urethane (meth)acrylate terminally having an acryloyl group or a methacryloyl group is used in a preferred manner.

The photopolymerizable compound having a silicone skeleton preferably has a weight average molecular weight (Mw) in the range of 500 to 50,000. More preferably, the weight average molecular weight (Mw) falls within the range of 2,000 to 20,000. The weight average molecular weight in the range mentioned above develops a sufficient light curing reaction, thereby making the silicone resin present in the respective anisotropic light diffusion layers of the anisotropic optical film 100 more likely to be oriented. The axes of scattering centers are made more likely to be sloped with the orientation of the silicone resin.

For example, the skeletons represented by the following general formula (1) may be applied as the silicone skeleton. In the general formula (1), $R_1$, $R_2$, $R_3$, $R_4$, $R_5$, and $R_6$ each independently have a functional group such as a methyl group, an alkyl group, a fluoroalkyl group, a phenyl group, an epoxy group, an amino group, a carboxyl group, a polyether group, an acryloyl group, or a methacryloyl group. In addition, in the general formula (1), n is preferably an integer of 1 to 500.

[Chemical Formula 1]

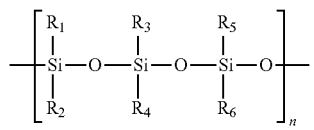
(1)

[Compound Having No Silicone Skeleton]

When a compound having no silicone skeleton is blended with the photopolymerizable compound having a silicone skeleton to form an anisotropic light diffusion layer, the low refractive index region and the high refractive index region are more likely to be formed separately, thereby making the degree of anisotropy higher, which is preferred. For the compound having no silicone skeleton, thermoplastic resins and thermo-setting resins can be used besides photopolymerizable compounds, and the compounds and resins can be used in combination. Polymers, oligomers, and monomers having a radical-polymerizable or cationic-polymerizable functional group can be used (however, without having any silicone skeleton) as the photopolymerizable compounds. The thermoplastic resins include polyesters, polyethers, polyurethanes, polyamides, polystyrenes, polycarbonates, polyacetals, polyvinyl acetate, and acrylic resins, and copolymers and modified products thereof. In the case of using the thermoplastic resin, the thermoplastic resin is dissolved with the use of a solvent that dissolves the resin, applied, and dried, and the photopolymerizable compound having a silicone skeleton is then subjected to curing with ultraviolet rays to form an anisotropic light diffusion layer. The thermo-setting resins include epoxy resins, phenolic resins, melamine resins, urea resins, and unsaturated polyesters, and copolymers and modified products thereof. In the case of using the thermo-setting resin, the photopolymerizable compound having a silicone skeleton is subjected to curing with ultraviolet rays, and then appropriately heated to provide the cured thermo-setting resin, thereby forming an anisotropic light diffusion layer. It is the photopolymerizable compound that is most preferred as a compound having no silicone skeleton, and the photopolymerizable compound is excellent in productivity, such as ease of separation between the low refractive index region and the high refractive index region, no need for any solvent in the case of using a thermoplastic resin, thereby resulting in no need for any drying process, and no need for any thermo-setting process, e.g., for a thermo-setting resin.

(Photoinitiator)

Examples of the photoinitiator that can cause polymerization of the radical polymerizable compound include benzophenone, benzyl, Michler's ketone, 2-chlorothioxantone, 2,4-diethyl thioxantone, benzoinethylether, benzoin isopropyl ether, benzoin isobutyl ether, 2,2-diethoxyacetophenone, benzyldimethylketal, 2,2-dimethoxy-1,2-diphenylethane-1-on, 2-hydroxy-2-methyl-1-phenylpropane-1-on, 1-hydroxy-cyclohexylphenylketone, 2-methyl-1-[4-(methylthio)phenyl]-2-morpholinopropanone-1, 1-[4-(2-hydroxyethoxy)-phenyl]-2-hydroxy-2-methyl-1-propane-1-on, bis (cyclopentadienyl)-bis(2,6-difluoro-3-(pyl-1-yl)titanium, 2-benzyl-2-dimethylamino-1-(4-morpholinophenyl)-butanone-1, and 2,4,6-trimethylbenzoyl diphenylphosphine oxide. In addition, these compounds may be each used alone, or two or more of the compounds may be used in mixture.

In addition, the photoinitiator for the cationic polymerizable compound is a compound that can generate an acid by light irradiation and cause polymerization of the above-described cationic polymerizable compound with the acid generated, and typically, an onium salt or a metallocene complex is used for the compound in a preferred manner. A diazonium salt, a sulfonium salt, an iodonium salt, a phosphonium salt, a selenium salt, or the like is used as the onium salt, and for the counter ion thereof, an anion is used such as $BF_4^-$, $PF_6^-$, $AsF_6^-$, and $SbF_6^-$. Specific examples include, but not limited thereto, 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, (4-methoxyphenyl)diphenylsulfonium hexafluoroantimonate, (4-methoxyphenyl)phenyliodenium hexafluoroantimonate, bis(4-t-butylphenyl)iodonium hexafluorophosphate, benzyltriphenylphosphonium hexafluoroantimonate, triphenylselenium hexafluorophosphate, and (η5-isopropylbenzene)(η5-cyclopentadienyl) iron (II) hexafluorophosphate. In addition, these compounds may be each used alone, or two or more of the compounds may be used in mixture.

(The Blend Proportion, Other Optional Component)

In the present embodiment, the photoinitiator mentioned above is combined at 0.01 to 10 parts by weight, preferably 0.1 to 7 parts by weight, more preferably 0.1 to 5 parts by weight with respect to 100 parts by weight of the photopolymerizable compound. This is because the photo-curable property is degraded at less than 0.01 parts by weight, whereas the inconvenience of internal curable property degraded by only the surface cured, coloring, and hindered formation of pillar structures are caused when the photoinitiator is combined in excess of 10 parts by weight. These photoinitiators are typically used by dissolving the powders directly in the photopolymerizable compound, but the photoinitiators dissolved in high concentrations in minute amounts of solvent in advance can be also used in the case of poor solubility. Such a solvent is further preferably photo-polymerizable, and specifically, examples of the solvent include propylene carbonate and γ-butyrolactone. In addition, it is also possible to add various types of known dyes and sensitizers, in order to improve the photo-polymerizable property. Furthermore, a thermo-setting initiator that can cause the photopolymerizable compound to be cured by heating can be used in combination with the photoinitiator. In this case, heating after light cure can further accelerate and complete polymerization and curing of the photopolymerizable compound.

In the present embodiment, the anisotropic light diffusion layers 110, 120 can be formed by curing the photopolymerizable compounds mentioned above alone, or curing a mixed composition of two or more of the compounds. In addition, the anisotropic light diffusion layers 110, 120 according to the present embodiment can be also formed by curing a mixture of the photopolymerizable compound and a non-photopolymerizable polymer resin. Polymer resins that can be used herein include acrylic resins, styrene resins, styrene-acrylic copolymers, polyurethane resins, polyester resins, epoxy resins, cellulosic resins, vinyl acetate resins, vinyl chloride-vinyl acetate copolymers, ad polyvinyl butyral resins. The polymer resin and the photopolymerizable compound need to have sufficient compatibility before light curing, but it is also possible to use various types of organic solvents and plasticizers, and the like in order to ensure the compatibility. It is to be noted that when an acrylate is used as the photopolymerizable compound, it is preferable in terms of compatibility to select the polymer resin from acrylic resins.

The ratio between the photopolymerizable compound having a silicone skeleton and the compound having no silicone skeleton preferably falls within the range of 15:85 to 85:15 in mass ratio. More preferably, the ratio falls within the range of 30:70 to 70:30. The range facilitates phase separation between the low refractive index region and the high refractive index region, and makes it easy to slope the pillar regions. When the ratio of the photopolymerizable compound having a silicone skeleton is less than the lower limit or greater the upper limit, the phase separation is made less likely to be facilitated, and the pillar regions are made less likely to be sloped. The use of silicone urethane (meth)acrylate as the photopolymerizable compound having a silicone skeleton improves the compatibility with the compound having no silicone skeleton. This makes it possible to slope the pillar regions even when the mixture ratio between the materials falls within a wide rage.

[Solvent]

For example, an ethyl acetate, a butyl acetate, acetone, methyl ethyl ketone, methyl isobutyl ketone, cyclohexanone, toluene, xylene, or the like can be used as a solvent in preparing the composition including the photopolymerizable compound.

<Manufacturing Process>

Next, a method (process) for manufacturing the anisotropic light diffusion layers 110, 120 according to the present embodiment. First, the composition including the photopolymerizable compound described above (hereinafter, referred to as a "photo-curable composition") is applied onto an appropriate base such as a transparent PET film or provided in the form of a sheet to form a film, thereby providing a photo-curable composition layer. The anisotropic light diffusion layers 110, 120 can be prepared by irradiating the photo-curable composition layer with light after the photo-curable composition layer is dried to vaporize the solvent, if necessary.

(Preparation of Anisotropic Light Diffusion Layer 110)

The process for forming the anisotropic light diffusion layer 110 according to the present embodiment mainly includes the following steps.

(1) Step 1-1 of providing a photo-curable composition layer onto a base
(2) Step 1-2 of obtaining parallel rays from a light source
(3) Step 1-3 of making light incident onto the photo-curable composition layer, thereby curing the photo-curable composition layer

[Approach for Providing Composition Including Photopolymerizable Compound in the Form of Sheet onto Base]

In the step 1-1 mentioned above, a normal coating method or printing method is applied as an approach for providing the composition including the photopolymerizable compound in the form of a sheet onto a base. Specifically, coating such as air doctor coating, bar coating, blade coating, knife coating, reverse coating, transfer roll coating, gravure roll coating, kiss coating, cast coating, spray coating, slot orifice coating, calendar coating, dam coating, dip coating, and die coating; printing such as intaglio printing, e.g., gravure printing, and intaglio printing, e.g., screen printing can be used, for example. When the composition has a low viscosity, a certain height of weir can be provided at the periphery of the base, and the composition can be cast in the space enclosed by the weir.

[Stacking of Mask]

In addition, in order to prevent the photo-curable composition layer from causing oxygen hindrance in the step 1-1, and thus form the pillar regions 113 as features of the anisotropic light diffusion layer 110 according to the present embodiment in an efficient manner, it is also possible to stack a mask that locally changes the irradiation intensity of light in close to the light irradiation side of the photo-curable composition layer. The material of the mask is preferably a light-absorbing filler such as carbon dispersed in a matrix, which is configured such that incident light is partially absorbed by the carbon, whereas light can adequately pass through openings. Patterning for controlling the amount of ultraviolet transmitted or a pigment that absorbs ultraviolet rays may be included in, as the matrix, a transparent plastic such as PET, TAC, PVAc, PVA, acrylic and polyethylene, an inorganic substance such as glass and quartz, or a sheet including the matrix. When such as mask is not used, it is also possible to prevent the photo-curable composition layer from causing oxygen hindrance by light irradiation under a nitrogen atmosphere. In addition, it is effective just to stack a normal transparent film on the photo-curable composition layer for preventing the oxygen hindrance and promoting the formation of the pillar regions 113. The light irradiation through such a mask or a transparent film develops a photopolymerization reaction in response to the irradiation intensity in the composition including the photopolymerizable compound, thus easily showing a refractive-index distribution, which is effective for the preparation of the anisotropic light diffusion layer 110 according to the present embodiment.

[Light Source]

As a light source for applying light irradiation to the composition including the photopolymerizable compound (photo-curable composition layer) with the light obtained in the step 1-2 mentioned above in the step 1-3 mentioned above, a short arc light source for ultraviolet generation is typically used, and specifically, it is possible to use a high-pressure mercury lamp, a low-pressure mercury lamp, a metal halide lamp, a xenon lamp, or the like. In addition, there is a need to irradiate the photo-curable composition layer with light rays parallel to the desired axis of scattering center Q, and the anisotropic light diffusion layer 110 can be prepared by disposing a point light source and disposing an optical lens such as a Fresnel lens for parallel light irradiation between the point light source and the photo-curable composition layer in order to obtain such parallel light, and irradiating the photo-curable composition layer with parallel light. On the other hand, in the case of using a linear light source, as described in JP 2005-292219 A, the anisotropic light diffusion layer 110 can be prepared by interposing an assembly of tubular articles between the linear light source and the composition including the sheet-like photopolymerizable compound, and applying light irradiation through the tubular articles. The use of a linear light source is preferred because continuous production can be achieved. A chemical lamp (a fluorescent lamp that emits ultraviolet ray) can be used as the linear light source. Chemical lamps with a diameter of 20 to 50 mm and an irradiation length of 100 to 1500 mm are commercially available, and can be appropriately selected in accordance with the size of the anisotropic light diffusion layer 110 created.

The light rays for irradiating the composition including the photopolymerizable compound need to include a wavelength that is able to cure the photo-polymerization compound, and light of wavelength centered at 365 nm from a mercury lamp is typically used. In the case of preparing the anisotropic light diffusion layers 110, 120 with the use of the wavelength range, the illuminance preferably falls within the range of 0.01 to 100 mW/cm$^2$, more preferably within the range of 0.1 to 20 mW/cm$^2$. This is because the illuminance less than 0.01 mW/cm$^2$ requires a long period of time for curing, thus degrading the production efficiency, whereas in excess of 100 mW/cm$^2$, excessively rapid curing of the photopolymerizable compound results in no structure formation, thereby making it impossible to provide intended anisotropic diffusion characteristics. It is to be noted that the light irradiation time is not particularly limited, but 10 to 180 seconds, more preferably 30 to 120 seconds. Thereafter, the anisotropic light diffusion layer 110 according to the present embodiment can be obtained by peeling the release film.

The anisotropic light diffusion layer 110 according to the present embodiment is obtained from the formation of a specific internal structure in the photo-curable composition layer by low-illuminance light irradiation for a relatively long period of time as described above. Therefore, just by the light irradiation, the unreacted monomer component may remain, and produce stickiness, thereby leading to problems with handling ability and durability. In such a case, the polymerization of the remaining monomers can be achieved by additional light irradiation at a high illuminance of 1000 mW/cm$^2$ or more. The light irradiation in this case may be carried out from the side opposite to the side with the mask stacked.

(Preparation of Anisotropic Light Diffusion Layer 120)

Figure 9A:
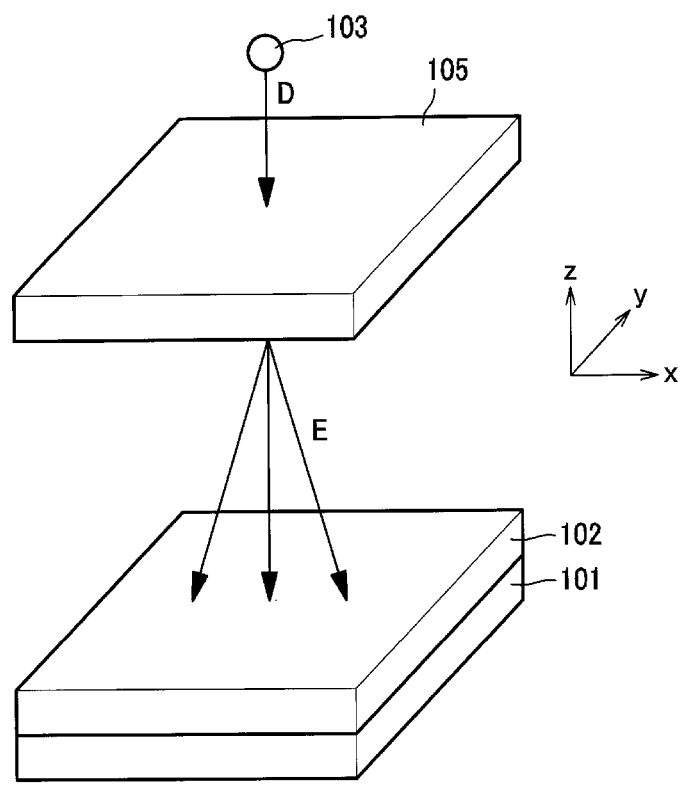
FIGS. 9(a) and 9(b) are pattern diagrams illustrating methods for manufacturing an anisotropic light diffusion layer (b) according to the present embodiment.
Figure 9B:
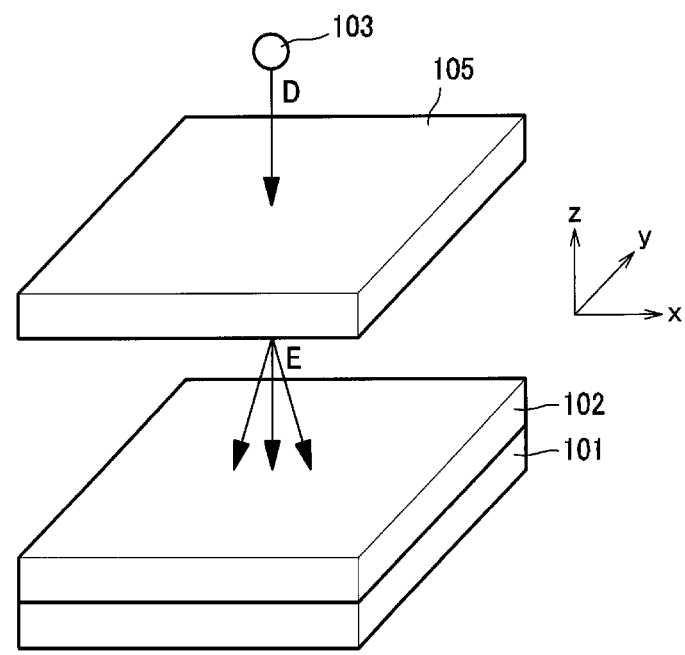

Next, a method (process) for preparing the anisotropic light diffusion layer 120 according to the present embodiment will be described with reference to FIGS. 9(a) and 9(b), mainly in terms of differences from the process for the anisotropic light diffusion layer 110. FIG. 9 is a pattern diagram illustrating a method for manufacturing the anisotropic light diffusion layer 120 according to the present embodiment.

The process for forming the anisotropic light diffusion layer 120 according to the present embodiment mainly includes the following steps.

(1) Step 2-1 of providing a photo-curable composition layer 102 onto a base 101

(2) Step 2-2 of obtaining parallel rays D from a light source 103

(3) Step 2-3 of making the parallel rays D incident onto a directional diffusion element 105, thereby providing directional light E (4) Step 2-4 of making the directional light E incident onto the photo-curable composition layer 102, thereby curing the photo-curable composition layer 102

The steps 2-1 and 2-2 are the same as those for the anisotropic light diffusion layer 110.

In the step 2-3, the sizes (aspect ratio, short diameter SA, long diameter LA, and the like) of the pillar regions 123 formed can be determined appropriately by adjusting the spread of directional light E. For example, the anisotropic light diffusion layer 120 according to the present embodiment can be obtained in each case of FIGS. 9(a) and 9(b). The difference between FIGS. 9(a) and 9(b) is that the spread of the directional light E is larger in FIG. 9(a) and smaller in FIG. 9(b). The sizes of the pillar regions 123 will vary depending on the magnitude of the spread of the directional light E.

The spread of the directional light E mainly depends on the distance between a directional diffusion element 105 and a photo-curable composition layer 102 and the type of the directional diffusion element 105. The sizes of the pillar regions 123 become smaller as the distance is made shorter, whereas the sizes of the pillar regions 123 become larger as the distance is made longer. Therefore, the sizes of the pillar regions 123 can be adjusted by adjusting the distance.

[Light Source 103]

As in the case of the formation of the anisotropic light diffusion layer 110, a short-arc ultraviolet generation light source is typically used as a light source 103 for applying light irradiation to the composition including the photopolymerizable compound (photo-curable composition). The light rays for irradiating the composition including the photopolymerizable compound need to include a wavelength that is able to cure the photo-polymerization compound, and light of wavelength centered at 365 nm from a mercury lamp is typically used, but any lamp can be used as long as the lamp is a light source including a wavelength close to the absorption wavelength of a photopolymerization initiator used. In the step 2-4, the photo-curable composition layer is subjected to curing to form the anisotropic light diffusion layer 120.

In order to create parallel rays D from light of UV light rays from the short arc mentioned above, for example, the parallel rays D can be obtained by disposing a reflector behind the light source 103 such that light is emitted as a point light source in a predetermined direction. The use of a point light source can readily provide the parallel rays D.

[Directional Diffusion Element 105]

The directional diffusion element 105 for use in the step 2-3 has only to provide the incident parallel rays D with directivity. In FIGS. 9(a) and 9(b), embodiments are shown where the directional light E mostly diffuses in the X direction, but hardly diffuses in the Y direction. In order to obtain directional light as just described, for example, a method can be adopted where the directional diffusion element 105 is made to contain therein needle-like fillers with a high aspect ratio, and the needle-like fillers are oriented such that the long axis direction extends in the Y direction. The directional diffusion element 105 can use various methods, besides the method of using needle-like fillers. Depending on the type of the directional diffusion element 105, the light diffusibility may vary according to the incidence part onto the directional diffusion element 105, but an arrangement may be adopted such that the parallel rays D pass through the directional diffusion element 105 to provide the directional light E.

The directional light E preferably has an aspect ratio of 2 or more and 20 or less. The aspect ratio of the pillar region 123 is formed in a manner that substantially corresponds to the aspect ratio of the light. There is a possibility that the diffusion range is narrower as the aspect ratio is decreased, and in the present embodiment, the aspect ratio is adjusted to 2 or more. On the other hand, the upper limit of the aspect ratio is preferably 10 or less, and more preferably 5 or less. There is a possibility that the light diffusibility and the light condensing property will be insufficient as the aspect ratio is increased.

[Curing]

In the step 2-4, the directional light E is made incident onto the photo-curable composition layer 102 to cure the photo-curable composition layer, thereby making it possible to obtain the anisotropic light diffusion layer 120 according to the present embodiment. For the photo-curable composition layer 102 is, in the same way as the anisotropic light diffusion layer 110, the appropriate base 101 such as a transparent PET film is coated to provide a coating film (photo-curable composition layer). If necessary, the solvent is vaporized by drying, and the dried film thickness is preferably 15 to 100 μm. Furthermore, a release film or an after-mentioned mask is laminated on the coating film or cured film, thereby creating a photosensitive stacked body.

It is to be noted that the foregoing is applied as described above in terms of the approach for providing the composition including the photopolymerizable compound (photo-curable composition) in the form of a sheet onto the base 101, the stacking of a mask, additional light irradiation at a high illuminance of 1000 mW/cm$^2$ or more, and the like.

The anisotropic optical film 100 according to the present embodiment can be obtained by stacking the anisotropic light diffusion layers 110, 120 prepared in the way described above in a direct manner or with the pressure-sensitive adhesive layer 130 interposed therebetween.

The pressure-sensitive adhesive for use in the pressure-sensitive adhesive layer 130 is not particularly limited as long as the adhesive has transparency, but an adhesive that has pressure-sensitive adhesiveness at ordinary temperature is used in a preferred manner. Examples of such an adhesive can include, for example, resins such as polyester resins, epoxy resins, polyurethane resins, silicone resins, and acrylic resins. In particular, acrylic resins are preferred in terms of high optical transparency and relative inexpensiveness. In the case of stacking a number of light diffusion layers (the light diffusion layers 110, 120 in the present embodiment) with a pressure-sensitive adhesive layer interposed therebetween, the pressure-sensitive adhesive layer preferably has a thickness around of 5 to 50 μm.

On the other hand, in the case of stacking the anisotropic light diffusion layer 120 directly on the anisotropic light diffusion layer 110, after curing a photo-curable composition layer for the anisotropic light diffusion layer 110, the composition including the photopolymerizable compound may be applied or provided in the form of a sheet directly onto the cured anisotropic light diffusion layer 110. Furthermore, the anisotropic light diffusion layer 120 is prepared in the same manner as the anisotropic light diffusion layer 110, thereby making it possible to obtain the anisotropic optical film 100.

<<Intended Use of Anisotropic Optical Film According to Present Embodiment>>

Figure 10:
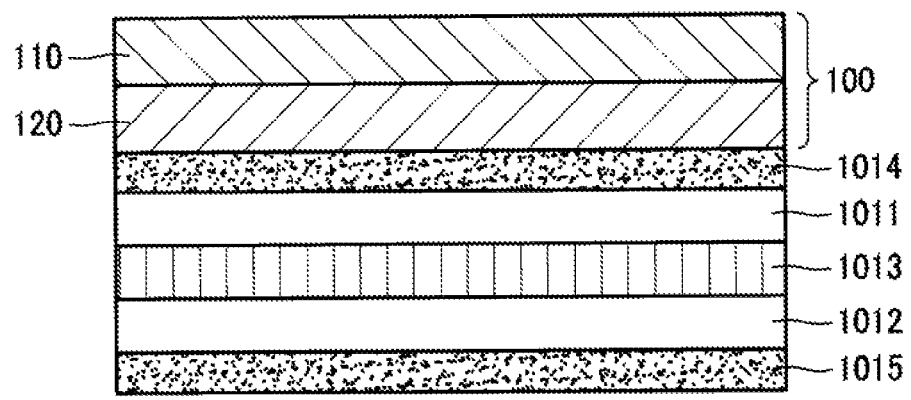
FIG. 10 is a pattern diagram illustrating an example of the configuration of a liquid crystal display device that uses an anisotropic optical film according to the embodiment.
Figure 11:
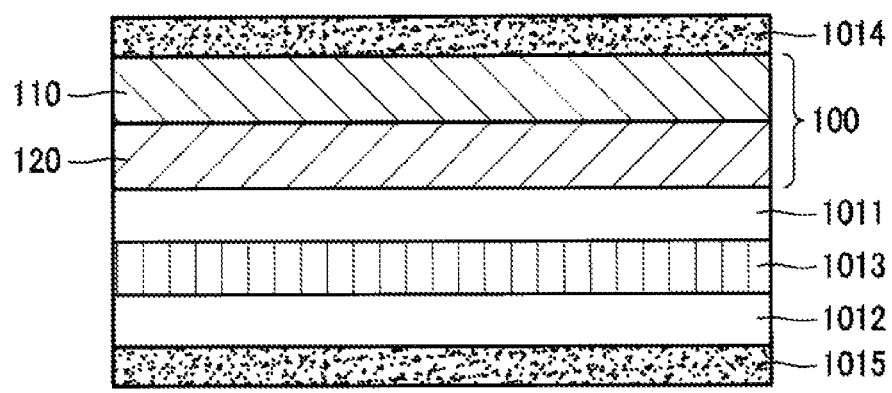
FIG. 11 is a pattern diagram illustrating an example of the configuration of a liquid crystal display device that uses an anisotropic optical film according to the embodiment.

The configuration of and manufacturing method for the anisotropic optical film 100 according to the present embodiment have been described above in detail, preferred intended uses of the anisotropic optical film 100 and will be subsequently described with reference to FIGS. 10 and 11. FIGS. 10 and 11 are pattern diagrams illustrating examples of the configuration of a liquid crystal display device that uses the anisotropic optical film 100 according to the present embodiment.

The anisotropic optical film 100 according to the present embodiment can be used in a preferred manner as a diffusion film for a display device. Display devices which are able to use the anisotropic optical film 100 in a preferred manner include, for example, liquid display devices (LCDs), plasma display panels (PDPs), organic EL displays, field emission displays (FEDs), rear projectors, cathode-ray tube display devices (CRT), surface electric field displays (SEDs), and electronic papers. The film is preferably, in particular, for the LCDs.

In addition, for example, in the case of using the anisotropic optical film 100 according to the present embodiment for an LCD, the anisotropic optical film 100 may be disposed on the emitted light side of the LCD. Specifically, as shown in FIGS. 10 and 11, for an LCD where a nematic liquid crystal 1013 is sandwiched between a pair of transparent glass substrates 1011, 1012 with transparent electrodes formed, and a pair of polarization plates 1014, 1015 is provided on both sides of the glass substrates 1011, 1012, the anisotropic optical film 100 can be disposed on the polarization plate 1014 or between the glass substrate 1011 and the polarization plate 1014. It is to be noted that known transparent glass substrates, nematic liquid crystals, and polarization plates can be typically used respectively as the transparent glass substrates, nematic liquid crystal, polarization plate, and the like mentioned above.

EXAMPLES

Next, the present invention will be further specifically described with examples and comparative examples, but the present invention is not limited by the examples in any way.

[Manufacture of Anisotropic Optical Film]

In accordance with the following methods, anisotropic optical films according to the present invention and anisotropic optical films according to comparative examples were produced.

Example 1

On the entire peripheral edge of a PET film (from Toyobo Co., Ltd., Trade Name: A4300) of 100 μm in thickness, a partition of 0.03 mm in height was formed from a curable resin with the use of a dispenser. This space within the wall was filled with the following photo-curable resin composition, and covered with a PET film.

silicone urethane acrylate (Refractive Index: 1.460, Weight Average Molecular Weight: 5,890) 20 parts by weight (from RAHN, Trade Name: 00-225/TM18)

Neopentyl Glycol Diacrylate (Refractive Index: 1.450) 30 parts by weight (from Daicel Cytec, Inc., Trade Name Ebecryl 145)

EO Adduct Diacrylate of Bisphenol A (Refractive Index: 1.536) 15 parts by weight (from Daicel Cytec, Inc., Trade Name Ebecyl 150)

Phenoxyethylacrylate (Refractive Index: 1.518) 40 parts by weight (from Kyoeisha Chemical Co., Ltd., Trade Name: Light Acrylate PO-A)

2,2-dimethoxy-1,2-diphenylethane-1-on 4 parts by weight (from BASF, Trade Name: Irgacure 651)

The liquid film of 0.03 mm in thickness, with both sides sandwiched between the PET films, was heated, and irradiated from above with parallel UV light rays emitted from an epi-illumination unit of a UV spot light source (from Hamamatsu Photonics K.K., Trade Name: L2859-01) perpendicularly from the normal direction at the coating film surface for 1 minute at an irradiation intensity of 5 mW/cm$^2$, thereby forming an anisotropic light diffusion layer with a large number of pillar structure on the PET film.

Furthermore, with the use of a partition of 0.05 mm, parallel rays emitted from an epi-illumination unit of a UV spot light source was converted into a linear light source of ultraviolet rays through a directional diffusion element for adapting the aspect ratio of transmitted UV light rays to 3, and perpendicular irradiation with the ultraviolet rays was carried out from above for 1 minute at an irradiation intensity of 5 mW/cm$^2$, thereby forming an anisotropic light diffusion layer with a large number of pillar structures on the PET film.

Table 1 shows the sizes (aspect ratio, long diameter LA, and short diameter SA) of the pillar structures for each anisotropic light diffusion layer after peeling the PET film. Furthermore, Table 2 shows the evaluation results of an optical characteristics of an anisotropic optical film obtained by stacking two anisotropic light diffusion layers with a transparent adhesive material of 25 μm in thickness interposed therebetween.

Example 2

In the same way as in Example 1 except for the use of a directional diffusion element for adapting the aspect ratio of transmitted UV light rays to 8, an anisotropic optical film according to Example 2 was obtained. Tables 1 and 2 show the sizes of the pillar structures for each anisotropic light diffusion layer in the anisotropic optical film, and the evaluation results of an optical characteristics of the anisotropic optical film.

Example 3

In the same way as in Example 1 except for the use of a directional diffusion element for adapting the aspect ratio of transmitted UV light rays to 16, an anisotropic optical film according to Example 3 was obtained. Tables 1 and 2 show the sizes of the pillar structures for each anisotropic light diffusion layer in the anisotropic optical film, and the evaluation results of an optical characteristics of the anisotropic optical film.

Example 4

In the same way as in Example 1 except that the first layer of PET film cover was changed to a photomask subjected to patterning in a random manner for providing pores of 4 μm, an anisotropic optical film according to Example 4 was obtained. Tables 1 and 2 show the sizes of the pillar structures for each anisotropic light diffusion layer in the anisotropic optical film, and the evaluation results of an optical characteristics of the anisotropic optical film.

Example 5

In the same way as in Example 1 except for the use of a directional diffusion element for adapting, to 4 μm, the short diameter of transmitted UV light rays through the directional diffusion element according to Example 1, an anisotropic optical film according to Example 5 was obtained. Tables 1 and 2 show the sizes of the pillar structures for each anisotropic light diffusion layer in the anisotropic optical film, and the evaluation results of an optical characteristics of the anisotropic optical film.

Example 6

In the same way as in Example 1 except for the use of a directional diffusion element for adapting, to 35 μm, the long diameter of transmitted UV light rays through the directional diffusion element according to Example 3, an anisotropic optical film according to Example 6 was obtained. Tables 1 and 2 show the sizes of the pillar structures for each anisotropic light diffusion layer in the anisotropic optical film, and the evaluation results of an optical characteristics of the anisotropic optical film.

Example 7

In the same way as in Example 1 except that the first layer of partition was adjusted to 0.015 mm, an anisotropic optical film according to Example 7 was obtained. Tables 1 and 2 show the sizes of the pillar structures for each anisotropic light diffusion layer in the anisotropic optical film, and the evaluation results of an optical characteristics of the anisotropic optical film.

Example 8

In the same way as in Example 1 except that the first layer of partition was adjusted to 0.02 mm, an anisotropic optical film according to Example 8 was obtained. Tables 1 and 2 show the sizes of the pillar structures for each anisotropic light diffusion layer in the anisotropic optical film, and the evaluation results of an optical characteristics of the anisotropic optical film.

Example 9

In the same way as in Example 1 except that the second layer of partition was adjusted to 0.03 mm, an anisotropic optical film according to Example 9 was obtained. Tables 1 and 2 show the sizes of the pillar structures for each anisotropic light diffusion layer in the anisotropic optical film, and the evaluation results of an optical characteristics of the anisotropic optical film.

Example 10

In the same way as in Example 1 except that the second layer of anisotropic diffusion layer was irradiated with parallel UV light rays inclined at 25° from the normal direction at the coating film surface, an anisotropic optical film according to Example 10 was obtained. Tables 1 and 2 show the sizes of the pillar structures for each anisotropic light diffusion layer in the anisotropic optical film, and the evaluation results of an optical characteristics of the anisotropic optical film.

Example 11

In the same way as in Example 1 except that the first layer of anisotropic diffusion layer was irradiated with parallel UV light rays inclined at 10° from the normal direction at the coating film surface, whereas the second layer of anisotropic diffusion layer was irradiated with parallel UV light rays inclined at 20° from the normal direction at the coating film surface, an anisotropic optical film according to Example 11 was obtained. Tables 1 and 2 show the sizes of the pillar structures for each anisotropic light diffusion layer in the anisotropic optical film, and the evaluation results of an optical characteristics of the anisotropic optical film.

Example 12

A stacked body of the same anisotropic diffusion layers as those in Example 1 was created without any pressure-sensitive adhesive interposed. After obtaining the first anisotropic diffusion layer, the PET film as a cover was peeled, a partition of 0.05 mm was then additionally formed further on the partition formed on the first layer, and the space on the first anisotropic light diffusion layer was filled with a similar photo-curable resin composition, and covered with a PET film. Thereafter, the second anisotropic light diffusion layer was formed through similar operation, thereby providing an anisotropic optical film of the first and second layers attached closely. Tables 1 and 2 show the sizes of the pillar structures for each anisotropic light diffusion layer in the anisotropic optical film, and the evaluation results of an optical characteristics of the anisotropic optical film.

Comparative Example 1

The same anisotropic diffusion layer as the first layer according to Example 1 was created. Only one anisotropic diffusion layer was created without obtaining any anisotropic optical film of anisotropic diffusion layers stacked. More specifically, an anisotropic optical film including only the same single anisotropic light diffusion layer as the first layer according to Example 1 was obtained in accordance with the present comparative example. Tables 1 and 2 show the sizes of the pillar structures for anisotropic light diffusion layer in the anisotropic optical film, and the evaluation results of an optical characteristics of the anisotropic optical film.

Comparative Example 2

In the same way except for the change of the directional diffusion element according to Example 1 to a directional diffusion element for adapting the aspect ratio of transmitted UV light rays and the long diameter thereof respectively to 50 and 100 μm, only a second layer of anisotropic diffusion layer was created. Only one anisotropic diffusion layer was created without obtaining any anisotropic optical film of anisotropic diffusion layers stacked. More specifically, an anisotropic optical film including only the single anisotropic light diffusion layer was obtained in accordance with the present comparative example. Tables 1 and 2 show the sizes of the pillar structures for anisotropic light diffusion layer in the anisotropic optical film, and the evaluation results of an optical characteristics of the anisotropic optical film.

Comparative Example 3

In the same way except for the change of the directional diffusion element according to Example 1 to a directional diffusion element for adapting the aspect ratio of transmitted UV light rays and the long diameter thereof respectively to 50 and 100 nm, an anisotropic optical film according to Comparative Example 3 was obtained. Tables 1 and 2 show the sizes of the pillar structures for anisotropic light diffusion layer in the anisotropic optical film, and the evaluation results of an optical characteristics of the anisotropic optical film.

Comparative Example 4

In the same way except that the directional diffusion element according to Example 1 was not used, an anisotropic optical film according to Comparative Example 4 was obtained. Tables 1 and 2 show the sizes of the pillar structures for each anisotropic light diffusion layer in the anisotropic optical film, and the evaluation results of an optical characteristics of the anisotropic optical film.

Comparative Example 5

In the same way except for the use, for both the first and second layers according to Example 1, of a directional diffusion element for adapting the aspect ratio of transmitted UV light rays and the long diameter thereof respectively to 50 and 100 μm, an anisotropic optical film according to Comparative Example 5 was obtained. Tables 1 and 2 show the sizes of the pillar structures for each anisotropic light diffusion layer in the anisotropic optical film, and the evaluation results of an optical characteristics of the anisotropic optical film.

Comparative Example 6

The same anisotropic diffusion layer as the second layer according to Example 1 was created only. Only one anisotropic diffusion layer was created without obtaining any anisotropic optical film of anisotropic diffusion layers stacked. More specifically, an anisotropic optical film including only the same single anisotropic light diffusion layer as the second layer according to Example 1 was obtained in accordance with the present comparative example. Tables 1 and 2 show the size of the pillar structure for the anisotropic light diffusion layer in the anisotropic optical film, and the evaluation results of an optical characteristics of the anisotropic optical film.

[Size of Pillar Region and Method for Evaluation of Optical Characteristics]

The anisotropic optical films produced in the ways described above according to the examples and the comparative examples were evaluated in the following ways.

(Measurement of Weight Average Molecular Weight of Silicone Urethane Acrylate)

The weight average molecular weight (Mw) of the silicone urethane acrylate used as the photopolymerizable compound was measured as a molecular weight in terms of polystyrene under the following conditions with the use of a GPC method.

Degasser: DG-980-51 (from JASCO Corporation)
Pump: PU-980-51 (from JASCO Corporation)

Autosampler: AS-950 (from JASCO Corporation)
Constant-Temperature Bath: C-965 (from JASCO Corporation)
Column: Shodex KF-806L×2 (from Showa Denko K.K.)
Detector: RI (SHIMAMURAYDR-880)
Temperature: 40° C.
Eluent: THF
Injection Volume: 150 μl
Flow Rate: 1.0 ml/min
Sample Concentration: 0.2%

(Surface Observation of Anisotropic Optical Film)

Surfaces (closer to the irradiation light in the ultraviolet irradiation) of the anisotropic optical films according to the examples and the comparative examples were observed with an optical microscope to measure the long diameter LA and short diameter SA of the pillar region. For the calculation of the long diameter LA and the short diameter SA, the maximum values were adopted among any 20 structures. In addition, the following ratio of long diameter LA/short diameter SA obtained was calculated as an aspect ratio.

(Linear Transmittance)

The anisotropic optical films according to the examples and the comparative examples were evaluated for optical characteristics with the use of a goniophotometer (from Genesia Corporation) capable of arbitrarily varying the floodlighting angle of a light source and the light-receiving angle of a detector as shown in FIG. 2. The detector was fixed in a position that receives straight light from the light source, and the anisotropic optical films obtained according to the examples and the comparative examples were set in a sample holder between the light source and the detector. The linear transmitted light quantity corresponding to each incident light angle was measured while rotating the sample around the axis of rotation (L) as shown in FIG. 2. This evaluation method can evaluate what angular range incident light is diffused in. This axis of rotation (L) is the same axis as the C-C axes in the structures of the samples shown in FIGS. 6(*b*) and 7(*b*). For the measurement of the linear transmitted light quantity, the wavelengths in a visible ray region was measured with the use of a luminous efficacy filter. The maximum value (maximum linear transmittance) and minimum value (minimum linear transmittance) of the linear transmittance were figured out on the basis of the optical profile obtained as a result of the foregoing measurement (see Table 1).

(MD Direction Diffusion and TD Direction Diffusion)

Figure 12:
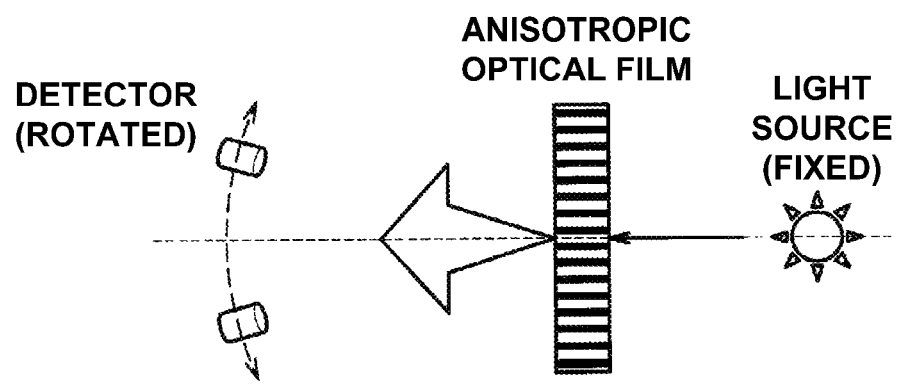
FIG. 12 is a pattern diagram illustrating the configuration of a unit for use in the evaluation of anisotropic optical films according to examples and comparative examples for MD direction diffusion and TD direction diffusion.

With the use of the unit as shown in FIG. 12, the anisotropic optical films according to the examples and the comparative examples were irradiated with straight light from a fixed light source, and the detector was allowed to receive the scattered transmitted light from the anisotropic optical films while moving (rotating) a detector in the MD direction and the TD direction, thereby measuring the transmittances. In each case of moving the detector in the MD direction and the TD direction, an optical profile was created on the basis of the transmittance measurement mentioned above. Then, from the respective optical profiles in moving in the MD direction and the TD direction, the angular ranges for ½ of the maximum transmittances were figured out, and the ranges were respectively regarded as the widths)(° of MD direction diffusion and TD direction diffusion.

(Rapid Change in Brightness)

Figure 13:
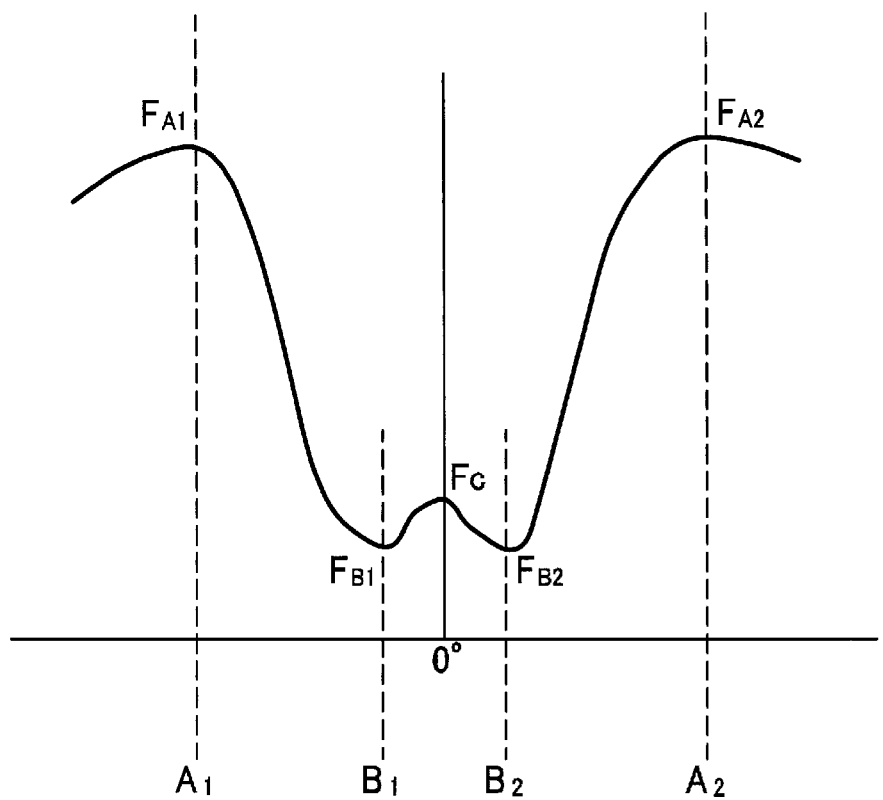
FIG. 13 is a graph for explaining a method for evaluating the anisotropic optical films according to the examples and the comparative examples for rapid change in brightness.

In the linear transmittance measurement described above, the brightness will also undergo a rapid change when the linear transmittance undergoes a rapid change between an angle A (°) for a maximum linear transmittance $F_A$ (%) and an angle B (°) for a minimum linear transmittance $F_B$ (%) as shown in FIG. 13, and the slope of the linear transmittance has been thus figured out to determine there is a rapid change in brightness when the slope is larger, and there is no rapid change in brightness when the slope is smaller. Specifically, with the slope α of the linear transmittance expressed by $(F_A-F_B)/|A-B|$, it has been determined that there is a rapid change in brightness when the slope α meets α≥1.7, there is a somewhat rapid change considered to fall within the acceptable range when the slope α meets 1.5≤α<1.7, and there is a gradual change in brightness without any feeling of strangeness when the slope α meets α<1.5. It is to be noted that as shown in FIG. 13, as for respective two maximum linear transmittances ($F_{A1}$ and $F_{A2}$) and two minimum linear transmittances ($F_{B1}$ and $F_{B2}$), the larger values of the following (a) and (b) were regarded as $F_A$ and A and $F_B$ and B.

$$(F_{A1}-F_{B1})/|A_1-B_1| \quad (a)$$

$$(F_{A2}-F_{B2})/|A_2-B_2| \quad (b)$$

More specifically, the larger value of (a) and (b) was used as a slope α from the maximum linear transmittance to the minimum linear transmittance in the optical profile.

(Glare)

Light reflection layers were provided for underlying layers under the anisotropic optical films according to the examples and the comparative examples, and light was made incident from above to visually confirm glare of reflected light.

TABLE 1

| Examples | First Layer Second Layer | Pillar Region | | | Maximum Linear Transmittance (%) | Minimum Linear Transmittance (%) |
| | | Aspect Ratio | Long Diameter LA (μm) | Short Diameter SA (μm) | | |
|---|---|---|---|---|---|---|
| Example 1 | columnar | 1 | 2.1 | 2.0 | 34 | 9 |
| | Intermediate | 3 | 6.3 | 2.1 | 51 | 11 |
| Example 2 | columnar | 1 | 2.2 | 1.9 | 36 | 10 |
| | Intermediate | 8 | 16 | 2.1 | 62 | 8 |
| Example 3 | columnar | 1 | 2.1 | 1.8 | 33 | 10 |
| | Intermediate | 16 | 30 | 1.9 | 71 | 6 |
| Example 4 | columnar | 1 | 4.2 | 4.1 | 42 | 14 |
| | Intermediate | 3 | 6.2 | 2.0 | 50 | 12 |
| Example 5 | columnar | 1 | 2.1 | 1.9 | 35 | 9 |
| | Intermediate | 3 | 12 | 4.1 | 56 | 15 |
| Example 6 | columnar | 1 | 2.1 | 2.0 | 37 | 11 |
| | Intermediate | 18 | 38 | 2.1 | 66 | 21 |

TABLE 1-continued

| Examples | First Layer Second Layer | Aspect Ratio | Pillar Region Long Diameter LA (µm) | Pillar Region Short Diameter SA (µm) | Maximum Linear Transmittance (%) | Minimum Linear Transmittance (%) |
|---|---|---|---|---|---|---|
| Example 7 | columnar | 1 | 2.1 | 2.0 | 64 | 23 |
|  | Intermediate | 3 | 6.4 | 2.1 | 49 | 9 |
| Example 8 | columnar | 1 | 2.2 | 1.9 | 55 | 14 |
|  | Intermediate | 3 | 6.2 | 2.1 | 51 | 10 |
| Example 9 | columnar | 1 | 2.0 | 1.8 | 34 | 9 |
|  | Intermediate | 3 | 6.4 | 2.0 | 85 | 23 |
| Example 10 | columnar | 1 | 2.1 | 1.8 | 40 | 10 |
|  | Intermediate | 3 | 6.2 | 2.0 | 50 | 10 |
| Example 11 | columnar | 1 | 2.1 | 2.0 | 34 | 9 |
|  | Intermediate | 3 | 6.3 | 2.1 | 50 | 11 |
| Example 12 | columnar | 1 | 2.0 | 1.9 | 36 | 10 |
|  | Intermediate | 3 | 6.3 | 2.1 | 51 | 12 |
| Comparative Example 1 | columnar None | 1 | 2.2 | 2.1 | 34 | 9 |
| Comparative Example 2 | None tabular | 51 | 107 | 2.1 | 67 | 5 |
| Comparative Example 3 | columnar tabular | 1 51 | 2.1 102 | 2.0 2.0 | 37 64 | 10 4 |
| Comparative Example 4 | columnar columnar | 1 1 | 2.0 2.2 | 1.9 2.0 | 33 36 | 9 10 |
| Comparative Example 5 | tabular tabular | 52 50 | 104 105 | 2.0 2.1 | 63 67 | 5 6 |
| Comparative Example 6 | None Intermediate | 3 | 6.4 | 2.0 | 50 | 10 |

TABLE 2

| Examples | Stacked Body Maximum Linear Transmittance (%) | Stacked Body MD Direction Diffusion (°) | Stacked Body TD Direction Diffusion (°) | Stacked Body Rapid Change in brightness | Stacked Body Glare |
|---|---|---|---|---|---|
| Example 1 | ○ 45 | ○ 35 | ○ 34 | ◎ | ◎ |
| Example 2 | ○ 49 | ○ 37 | Δ 29 | ◎ | ◎ |
| Example 3 | ○ 53 | ○ 39 | Δ 23 | ◎ | ◎ |
| Example 4 | ○ 45 | Δ 28 | Δ 26 | ◎ | ◎ |
| Example 5 | ○ 47 | ○ 38 | Δ 25 | ◎ | ◎ |
| Example 6 | ○ 49 | ○ 38 | Δ 24 | ◎ | ◎ |
| Example 7 | ○ 53 | Δ 28 | Δ 25 | ◎ | ◎ |
| Example 8 | ○ 54 | Δ 25 | Δ 23 | ◎ | ◎ |
| Example 9 | ○ 52 | ○ 38 | Δ 24 | ◎ | ◎ |
| Example 10 | ○ 45 | Δ 26 | Δ 22 | ◎ | ◎ |
| Example 11 | ○ 45 | ◎ 40 | ○ 34 | ◎ | ◎ |
| Example 12 | ○ 45 | ○ 35 | ○ 34 | ◎ | ◎ |
| Comparative Example 1 | Δ 35 | X 14 | X 13 | ◎ | ◎ |
| Comparative Example 2 | ◎ 65 | ◎ 44 | X 3 | X | X |
| Comparative Example 3 | ○ 45 | ○ 38 | X 18 | X | X |
| Comparative Example 4 | X 12 | Δ 24 | Δ 24 | ◎ | ◎ |
| Comparative Example 5 | ◎ 62 | ◎ 48 | X 2 | X | X |
| Comparative Example 6 | ○ 50 | Δ 24 | X 11 | Δ | Δ |

<Evaluation Criteria>

The evaluation criteria in Table 2 are as follows.

"Maximum Linear Transmittance"
◎ 55% or more
○ 40% or more and less than 55%
Δ 30% or more and less than 40%
x less than 30%

"MD Direction Diffusion"
◎ 40° or more
○ 30° or more and less than 40°
Δ 20° or more and less than 30°
x less than 20°

"TD Direction Diffusion"
◎ 40° or more
○ 30° or more and less than 40°
Δ 20° or more and less than 30°
x less than 20°

"Rapid Change in brightness"
◎ gradual change in brightness without any feeling of strangeness
Δ somewhat rapid change within the acceptable range
x rapid change in brightness "Glare"
◎ no glare
Δ some glare within the acceptable range
x clear glare

[Evaluation Result]

As shown in Table 2, the anisotropic optical films according to the examples have high maximum linear transmittances and large diffusion widths in the MD direction and the TD direction, and has high levels of characteristics with balance in terms of all the evaluation items, without any rapid change in brightness or glare. In particular, Example 1, without being evaluated as Δ, can be thus considered to be a particularly excellent anisotropic optical film. On the other hand, the anisotropic optical films according to the comparative examples have better evaluations than the examples in terms of a specific item, but have very bad results of x in terms of at least any one or more items of maximum linear transmittance, MD direction diffusion, TD direction diffusion, rapid change in brightness, and glare, and there is not any film that has high levels of characteristics with balance in terms of all the evaluation items as in the examples.

Accordingly, the anisotropic optical films according to the examples can achieve a balance between a high linear transmittance in the non-diffusion region and large diffusion regions in the MD direction and the TD direction, and suppress the rapid change in brightness and the generation of glare while having excellent display characteristics (e.g., brightness and contrast), when the anisotropic optical films are used as diffusion films of display panels.

While the preferred embodiment of the present invention has been described with reference to the drawings, the present invention is not limited to the embodiment described above. More specifically, it is understood that other embodiments or various types of modification examples that could have been conceived of by one skilled in the art within the scope of the invention as specified in the claims also fall within the technical scope of the present invention.

For example, while the anisotropic optical film 100 including the two layers of the anisotropic light diffusion layers 110 and 120 as anisotropic light diffusion layers has been described in the embodiment described above, the anisotropic optical film according to the present invention may have three or more anisotropic light diffusion layers.

The invention claimed is:

1. An anisotropic optical film comprising two or more anisotropic light diffusion layers where a linear transmittance varies depending on an incident light angle, wherein each of the anisotropic light diffusion layers has a matrix region and a plurality of pillar regions that differ in refractive index from the matrix region, the film comprises, as the anisotropic light diffusion layers, at least two types of anisotropic light diffusion layers (a) and (b) that differ in aspect ratio (long diameter/short diameter) between a short diameter and a long diameter at a cross section perpendicular to an orientation direction of the pillar regions, the aspect ratio between the short diameter and the long diameter in the pillar regions is less than 2 in the anisotropic light diffusion layer (a), and the aspect ratio between the short diameter and the long diameter in the pillar regions is 2 or more and 20 or less in the anisotropic light diffusion layer (b).

2. The anisotropic optical film according to claim 1, wherein in the anisotropic light diffusion layer (a), the short diameter at a cross section of the pillar region has a maximum diameter adjusted to a value in a range of 0.5 to 5 μm, whereas the long diameter at the section has a maximum diameter adjusted to a value in a range of 0.5 to 8 μm, and in the anisotropic light diffusion layer (b), the short diameter at a cross section of the pillar region has a maximum value adjusted to a value in a range of 0.5 to 5 μm, whereas the long diameter at the section has a maximum diameter adjusted to a value in a range of 1 to 40 μm.

3. The anisotropic optical film according to claim 1, wherein each of the anisotropic light diffusion layer has a maximum linear transmittance of 20% or more and less than 95% as a linear transmittance of incident light at an incident light angle that maximizes the linear transmittance, and a minimum linear transmittance of 25% or less as a linear transmittance of incident light at an incident light angle that minimizes the linear transmittance.

4. The anisotropic optical film according to claim 1, wherein the anisotropic light diffusion layer (a) has the maximum linear transmittance of 20% or more and less than 60%, and the minimum linear transmittance of 20% or less, and the anisotropic light diffusion layer (b) has the maximum linear transmittance of 30% or more and less than 95%, and the minimum linear transmittance of 25% or less.

5. The anisotropic optical film according to claim 1, wherein the anisotropic light diffusion layers each have at least one axis of scattering center, and when a polar angle θ (−90°<θ<90°) between a normal line of the anisotropic light diffusion layer and the axis of scattering center is regarded as an angle of the axis of scattering center, an absolute value of a difference is 0° or more and 30° or less between the angle of the axis of scattering center for the anisotropic light diffusion layer (a) and the angle of the axis of scattering center for the anisotropic light diffusion layer (b).

6. The anisotropic optical film according to claim 1, wherein the anisotropic light diffusion layers are each 15 μm or more and 100 μm or less in thickness.

7. The anisotropic optical film according to claim 1, the anisotropic optical film further comprising a transparent pressure-sensitive adhesive layer between the multiple anisotropic light diffusion layers.

8. A method for manufacturing the anisotropic optical film according to claim 1, the method comprising an anisotropic light diffusion layer (a) formation step of forming the anisotropic light diffusion layer (a); and an anisotropic light diffusion layer (b) formation step of forming the anisotropic light diffusion layer (b), wherein the anisotropic light diffusion layer (a) formation step comprises the steps of: obtaining a parallel ray from a light source; and making the light incident onto a photo-curable composition layer, thereby curing the photo-curable composition layer, and the anisotropic light diffusion layer (b) formation step comprises the steps of: obtaining a parallel ray from a light source; making the parallel ray incident onto a directional diffusion element, thereby providing directional light; and making the directional light incident onto a photo-curable composition layer, thereby curing the photo-curable composition layer.

9. The method for manufacturing an anisotropic optical film according to claim 8, wherein the directional light has an aspect ratio in a range of 2 or more and 20 or less.

10. The anisotropic optical film according to claim 2, wherein each of the anisotropic light diffusion layer has a maximum linear transmittance of 20% or more and less than 95% as a linear transmittance of incident light at an incident light angle that maximizes the linear transmittance, and a minimum linear transmittance of 25% or less as a linear transmittance of incident light at an incident light angle that minimizes the linear transmittance.

11. The anisotropic optical film according to claim 2, wherein the anisotropic light diffusion layer (a) has the maximum linear transmittance of 20% or more and less than 60%, and the minimum linear transmittance of 20% or less, and the anisotropic light diffusion layer (b) has the maximum linear transmittance of 30% or more and less than 95%, and the minimum linear transmittance of 25% or less.

12. The anisotropic optical film according to claim 2, wherein the anisotropic light diffusion layers each have at least one axis of scattering center, and when a polar angle θ (−90°<θ<90°) between a normal line of the anisotropic light diffusion layer and the axis of scattering center is regarded as an angle of the axis of scattering center, an absolute value of a difference is 0° or more and 30° or less between the angle of the axis of scattering center for the anisotropic light diffusion layer (a) and the angle of the axis of scattering center for the anisotropic light diffusion layer (b).

13. The anisotropic optical film according to claim 2, wherein the anisotropic light diffusion layers are each 15 μm or more and 100 μm or less in thickness.

14. The anisotropic optical film according to claim 2, the anisotropic optical film further comprising a transparent pressure-sensitive adhesive layer between the multiple anisotropic light diffusion layers.

15. A method for manufacturing the anisotropic optical film according to claim 2, the method comprising an anisotropic light diffusion layer (a) formation step of forming the anisotropic light diffusion layer (a); and an anisotropic light diffusion layer (b) formation step of forming the anisotropic light diffusion layer (b), wherein the anisotropic light diffusion layer (a) formation step comprises the steps of: obtaining a parallel ray from a light source; and making the light incident onto a photo-curable composition layer, thereby curing the photo-curable composition layer, and the anisotropic light diffusion layer (b) formation step comprises the steps of: obtaining a parallel ray from a light source; making the parallel ray incident onto a directional diffusion element, thereby providing directional light; and making the directional light incident onto a photo-curable composition layer, thereby curing the photo-curable composition layer.

16. A method for manufacturing the anisotropic optical film according to claim 3, the method comprising an anisotropic light diffusion layer (a) formation step of forming the anisotropic light diffusion layer (a); and an anisotropic light diffusion layer (b) formation step of forming the anisotropic light diffusion layer (b), wherein the anisotropic light diffusion layer (a) formation step comprises the steps of: obtaining a parallel ray from a light source; and making the light incident onto a photo-curable composition layer, thereby curing the photo-curable composition layer, and the anisotropic light diffusion layer (b) formation step comprises the steps of: obtaining a parallel ray from a light source; making the parallel ray incident onto a directional diffusion element, thereby providing directional light; and making the directional light incident onto a photo-curable composition layer, thereby curing the photo-curable composition layer.

17. A method for manufacturing the anisotropic optical film according to claim 10, the method comprising an anisotropic light diffusion layer (a) formation step of forming the anisotropic light diffusion layer (a); and an anisotropic light diffusion layer (b) formation step of forming the anisotropic light diffusion layer (b), wherein the anisotropic light diffusion layer (a) formation step comprises the steps of: obtaining a parallel ray from a light source; and making the light incident onto a photo-curable composition layer, thereby curing the photo-curable composition layer, and the anisotropic light diffusion layer (b) formation step comprises the steps of: obtaining a parallel ray from a light source; making the parallel ray incident onto a directional diffusion element, thereby providing directional light; and making the directional light incident onto a photo-curable composition layer, thereby curing the photo-curable composition layer.

18. The method for manufacturing an anisotropic optical film according to claim 15, wherein the directional light has an aspect ratio in a range of 2 or more and 20 or less.

19. The method for manufacturing an anisotropic optical film according to claim 16, wherein the directional light has an aspect ratio in a range of 2 or more and 20 or less.

20. The method for manufacturing an anisotropic optical film according to claim 17, wherein the directional light has an aspect ratio in a range of 2 or more and 20 or less.

* * * * *